US012797978B2

(12) United States Patent
Doeppner et al.

(10) Patent No.: US 12,797,978 B2
(45) Date of Patent: Nov. 17, 2026

(54) METHOD FOR OPERATING A MACHINE TOOL WITH A GENTLE START-UP

(71) Applicant: Robert Bosch GmbH, Stuttgart (DE)

(72) Inventors: Holger Alexander Doeppner, Reutlingen (DE); Christian Renner, Tuebingen (DE); Thorsten Kuehn, Eislingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/846,941

(22) PCT Filed: Mar. 30, 2023

(86) PCT No.: PCT/EP2023/058352
§ 371 (c)(1),
(2) Date: Sep. 13, 2024

(87) PCT Pub. No.: WO2023/187087
PCT Pub. Date: Oct. 5, 2023

(65) Prior Publication Data

US 2025/0196240 A1 Jun. 19, 2025

(30) Foreign Application Priority Data

Mar. 31, 2022 (DE) ..................... 10 2022 203 185.7

(51) Int. Cl.
*B25F 5/00* (2006.01)
*B23D 51/16* (2006.01)
*B23D 59/00* (2006.01)

(52) U.S. Cl.
CPC ......... *B23D 59/001* (2013.01); *B23D 51/161* (2024.05); *B25F 5/00* (2013.01)

(58) Field of Classification Search
CPC .......... B25F 5/00; B23D 59/001; B23D 51/16
(Continued)

(56) References Cited

U.S. PATENT DOCUMENTS

2004/0113583 A1* 6/2004 Konigbauer .............. B25F 5/00 318/778
2014/0352995 A1* 12/2014 Matsunaga ............ B23Q 5/027 173/179
(Continued)

FOREIGN PATENT DOCUMENTS

DE 3335237 A1 4/1985
DE 202014102422 U1 8/2014
(Continued)

OTHER PUBLICATIONS

International Search Report corresponding to PCT Application No. PCT/EP2023/058352, mailed Jul. 21, 2023. (German and English language document). (7 pages).

*Primary Examiner* — Linda J. Hodge
(74) *Attorney, Agent, or Firm* — Maginot, Moore & Beck LLP

(57) ABSTRACT

A method for operating a machine tool with a gentle start-up, wherein at least one physical characteristic of the machine tool, in particular a motor and/or battery current, is detected by a detection unit, in particular a control or regulating unit of the machine tool, in an idle operating state of the machine tool with a throttled movement. A threshold of the physical characteristic, in particular a scraping threshold, is ascertained by an analysis unit, in particular the control or regulating unit of the machine tool, on the basis of the detected physical characteristic, and in further operation of the machine tool, a drive unit of the machine tool is set to an operating state under load, with a movement speed which is increased relative to the idle operating state with a throttled movement, when it is detected that the ascertained threshold has been overshot or undershot.

12 Claims, 9 Drawing Sheets

Figure 1:
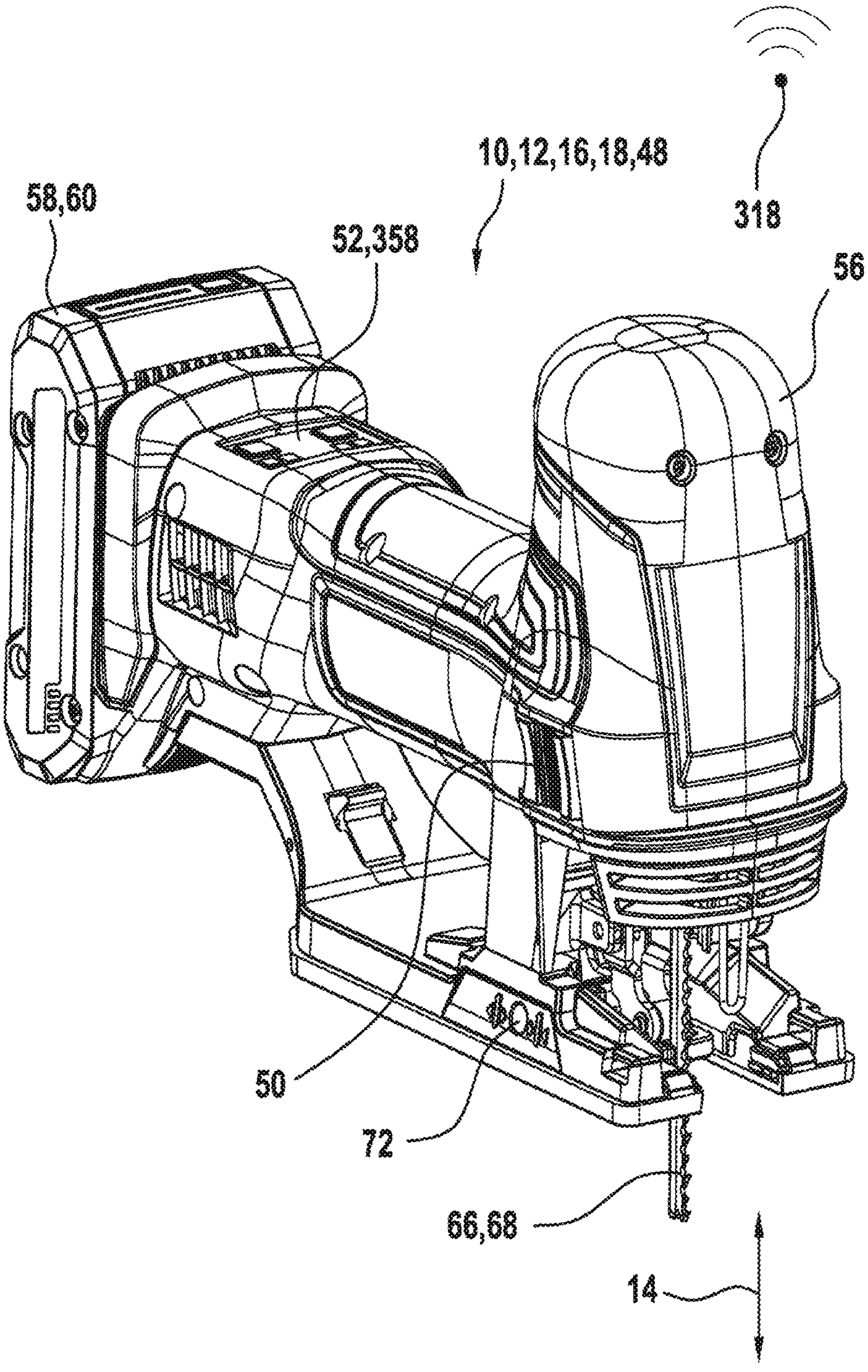

(58) Field of Classification Search
USPC .......................................................... 173/1, 2
See application file for complete search history.

(56) References Cited

U.S. PATENT DOCUMENTS

| | | | | |
|---|---|---|---|---|
| 2015/0042254 A1* | 2/2015 | Kato | ........................ | G05B 6/02 318/458 |
| 2017/0216986 A1* | 8/2017 | Dey, IV | ................. | B23D 51/16 |

FOREIGN PATENT DOCUMENTS

| | | | | | | |
|---|---|---|---|---|---|---|
| DE | 202014103265 | U1 | | 10/2014 | | |
| DE | 102014011493 | A1 | | 2/2015 | | |
| EP | 1396928 | A2 | | 3/2004 | | |
| EP | 2680093 | A2 | * | 1/2014 | ................ | B25F 5/00 |
| EP | 3411204 | B1 | | 7/2021 | | |
| WO | WO20200175007 | | * | 9/2020 | ................ | B25F 5/00 |
| WO | WO-2022014299 | A1 | * | 1/2022 | ................ | B25F 5/00 |

* cited by examiner

METHOD FOR OPERATING A MACHINE TOOL WITH A GENTLE START-UP

This application is a 35 U.S.C. § 371 National Stage Application of PCT/EP2023/058352, filed on Mar. 30, 2023 which claims the benefit of priority to Serial No. DE 10 2022 203 185.7, filed on Mar. 31, 2022 in Germany, the disclosure of which is incorporated herein by reference in its entirety.

BACKGROUND

Methods for operating a machine tool with gentle start-up and machine tools with it are already known. During gentle start-up, a machine tool or a tool of the machine tool is initially operated with a throttled movement. When a workpiece is scratched in an operating state with a throttled movement, an overshoot of a fixed scraping threshold set by the manufacturer is ascertained and the machine tool is automatically set to an operating state under load with an increased movement speed of the tool relative to the operating state with a throttled movement As a result, a workpiece can be scratched with low tear-out at a throttled or reduced movement speed of the tool, enabling rapid further processing of the workpiece in the operating state under load.

However, it can happen that the machine tool switches to operating state under load either too early, too late or not at all, which reduces the cutting quality, user comfort or work progress.

SUMMARY

The disclosure relates to a method for operating a machine tool with the features of the disclosure. A machine tool adapted to carry out this method is also claimed. A system comprising a machine tool and an external unit adapted to perform this method is also claimed. Sometimes a functional interface is also required to enable a gentle start-up that can be configured and/or gentle start-up that can be adapted. Advantageous further embodiments can be found in the dependent claims.

This method allows a machine tool to be operated with a gentle start-up that can be adapted. A corresponding machine tool or a system consisting of a machine tool and an external unit can also be provided. Advantageously, the manufacturer no longer stores a fixed, unchangeable scraping threshold, e.g. for the voltage of the drive motor of the machine tool, in the control or regulating unit of the machine tool, above which the machine tool automatically—in particular in a non-adaptive manner—changes from an idle mode with a throttled movement to an operating state under load.

"Adaptive" means a variable gentle start-up or a gentle start-up that adapts to the respective operating conditions of the machine tool. Advantageously, the gentle start-up adapts or changes automatically to different operating conditions of the machine tool and/or for the machine tool. In particular, a gentle start-up adapted to the respective tool, the operating conditions and/or the state of the machine tool can be facilitated. For example, adapted to the mass or inertia of the respective driven or inserted tool or adapted to other tool properties and/or adapted to the respective setting, state and/or orientation of the machine tool. The respective setting can be understood, for example, as the set idling rotational speed with a throttled movement. For example, in the case of a jigsaw, setting can also mean operation with or without a pendulum stroke or the strength of the pendulum stroke or similar. State means in particular a run-in state—the drive train of a brand-new machine tool, for example, has a higher internal resistance—and/or a lubrication state of the machine tool, an internal resistance of the battery pack and/or the machine tool, in particular due to its operating temperature and/or the like. Orientation can, for example, be understood as the orientation of the machine tool in space, e.g. the tool points vertically downwards or towards the ground, vertically upwards or towards the sky or in a horizontal direction or transversely to the side; or the machine tool has any orientation in between. The machining quality that can be achieved with the machine tool can be improved by the adapting. In particular, the switchover time or acceleration time between the idle operating state with a throttled movement and the operating state under load, which is accelerated in particular relative to the idle operating state with a throttled movement, can be optimized. During operation, the machine tool therefore no longer switches to the operating state under load too early or too late or not at all, but at an improved point in time. This can increase the machining or cutting quality that can be achieved with the machine tool.

The gentle start-up characterizes an operation of the machine tool with a throttled movement, in particular after switching on the machine tool, and subsequently, after detecting an overshoot or undershoot of a threshold, in particular a scraping threshold, an accelerated operation of the machine tool, in particular of a drive unit of the machine tool, advantageously of an output of the machine tool driven by the drive unit of the machine tool or of a tool mounted on it. The threshold is defined in the form of a typical physical characteristic of the machine tool for scratching. The gentle start-up allows a workpiece to be scratched or an initial penetration of the tool into a workpiece to take place at a reduced tool speed; before the machine tool is transferred to an operating state under load when complete workpiece contact has been made and/or the tool has penetrated the workpiece. Tear-outs and faulty cuts can thus be avoided and the cutting quality and ease of use increased.

A method is proposed for operating a machine tool with a gentle start-up, in particular a hand-held machine tool, advantageously with an oscillating or stroke-shaped output movement, for example a reciprocating saw, preferably a jigsaw or an oscillating multifunction tool, comprising the following steps:

- detecting—in particular by means of a control or regulating unit of the machine tool—of at least one physical characteristic of the machine tool, in particular a motor and/or battery current of the machine tool, during an idle operating state of the machine tool with a throttled movement,
- ascertaining a threshold, in particular a scraping threshold, in particular a motor current scraping threshold, based on the detected physical characteristic, in particular by means of the control or regulating unit of the machine tool,
- The machine tool's drive unit is set to an operating state under load when an overshoot or undershoot of the ascertained threshold, in particular the scraping threshold, is detected.

This provides a method for operating a machine tool with adaptive gentle start-up. Advantageously, the physical characteristic is detected by means of a detection unit and the scraping threshold is ascertained by means of an analysis unit. Advantageously, the detection unit and the analysis unit are a common unit, preferably the control or regulating unit of the machine tool, but could also be an external unit, for example, in particular an external unit connected to the control or regulating unit of the machine tool.

Advantageously, the scraping threshold is determined or calculated as a function of or based on the ascertaining of a base value of the physical characteristic, in particular a base average value. In particular, by ascertaining a scraping threshold that deviates from the base value as a percentage or absolute value and defining it as the threshold. In particular, "defined" should be understood that the ascertained or calculated threshold is stored in at least one buffer and/or the control or regulating unit so that an overshoot or undershoot can be reliably detected. The detection of an overshoot or undershoot of the threshold, which is defined in particular, is carried out by continuing to detect the physical characteristic, in particular by the detection unit and/or, in particular, by analyzing it using the analysis unit and comparing it with the defined threshold. Detection is advantageously carried out by the detection unit and/or another detection unit. The detection unit thus monitors the physical characteristic, preferably continuously, in particular during operation of the machine tool. Relative to the idle operating state with a throttled movement, the operating state under load is at least a state with increased movement speed of an output or a tool that can be driven by the drive or the drive unit of the machine tool.

The disclosure is thus based on a method for operating a machine tool with gentle start-up. The machine tool is initially operated in an idle operating state with a throttled movement or an idle mode movement state with a throttled movement. In particular, corresponding to operation of the machine tool with reduced drive rotational speed. In particular, at least initially free from external loads. If a threshold or scraping threshold of a physical characteristic is overshot or undershot, the machine tool is set to an operating state under load or a load mode movement state or accelerated to it. In particular, the machine tool is at least controlled accordingly, even if the resistance caused by the machining of a workpiece is sometimes still so high that at least an increased movement speed is not immediately achieved. In particular, a provided current, a voltage and/or a rotational speed of the drive unit is increased, or the drive unit is energized accordingly or a corresponding power is applied to it to achieve the operating state under load. It could also be said that a method for operating a machine tool with gentle start-up means operation with initially reduced drive, output and/or tool speed or rotational speed or stroke rate or the like, before, in particular when or after overshooting a force threshold, a load and/or current threshold of the machine tool, in particular the drive unit of the machine tool or the like; or undershooting of a drive, output and/or tool speed or undershooting of a rotational speed or stroke rate of the machine tool or the like, it is automatically set to an operating state under load, so to speak.

The machine tool is advantageously operated immediately after the machine tool is switched on in the idle operating state with a throttled movement or idle mode movement state. A load, a rotational speed, a current, a stroke rate and/or a drive, output and/or tool speed of the machine tool are reduced. On the other hand, in the operating state under load or in the load mode movement state, a load, a rotational speed, a current, a stroke rate and/or a drive, output and/or tool speed of the machine tool is increased, at least relative to the idle operating state with a throttled movement, in particular a motor rotational speed and/or a motor current of a drive motor of the machine tool is increased, advantageously by a multiple greater than in the idle operating state or movement state with a throttled movement.

In particular, the machine tool can be a hand-held machine tool, preferably with an oscillating output movement, for example a reciprocating saw, preferably a jigsaw, reciprocating saw or an oscillating multifunction tool, such as the "Bosch GOP 18V-28 Professional". The machine tool is intended for processing workpieces, in particular for sawing workpieces. It can advantageously be transported by one operator without a transport machine. In principle, other machine tools, e.g. with cutting, turning, beating or the like, are also conceivable. The machine tool, in particular the portable machine tool or hand-held tool, has in particular a mass which is less than 40 kg, preferably less than 10 kg and particularly preferably less than 5 kg.

It is proposed that in at least one method step, at least one physical characteristic of the machine tool is detected by means of a detection unit. In particular, a physical characteristic of a drive unit and/or a power supply unit of the machine tool, for example a motor and/or battery current. However, another physical characteristic can also be detected, for example a drive or output train component and/or a machining tool of the machine tool. The detection takes place at least during a state of the machine tool with a throttled movement, in particular an idle operating state or movement state of the machine tool. The idle mode movement state corresponds to a state in which essentially only internal resistances of the machine tool act, in particular in the connected state with the respective tool, but advantageously no external resistances and/or forces are generated, in particular not those that would be essentially generated by the machining of a workpiece.

The detection unit can, for example, be designed as a sensor unit comprising at least one sensor and/or advantageously as a control or regulating unit of the machine tool, or the like. The detection unit can be designed as an external unit which detects the physical characteristic and is at least indirectly connected to the machine tool or the control or regulating unit of the machine tool, in particular by wireless or wired connection, in order to make at least one detected signal available to the machine tool for tapping or to transmit the detected data or information to the machine tool, or the like.

The physical characteristic is advantageously detected as a function of time. The physical characteristic can advantageously be a current recorded by the drive unit, in particular a motor or electric motor or a power supply unit, e.g. a battery or a battery pack or the like, for example a current of the drive unit and/or the power supply unit that is controlled or regulated, monitored and/or detected by a control and regulating unit. The physical characteristic can also be a rotational speed, in particular of the drive unit, a drive train component, a drive or output of the machine tool or the tool. It can also be an input or output or tool speed or a stroke rate of the machine tool or a tool of the machine tool. In principle, the physical characteristic can also be a voltage, an airborne sound, a vibration, a battery vibration, a machine tool vibration and/or the like, which is advantageously suitable for distinguishing an idle operating state of the machine tool from an operating state deviating therefrom, in particular a scratching operating state in which a workpiece is scratched by a tool driven by the machine tool, or an operating state under load.

A state with a throttled movement is to be understood in particular as a state of the machine tool with reduced drive, output and/or tool speed and/or reduced rotational speed and/or stroke rates. An idle mode movement state is to be understood in particular as a state during operation of the machine tool which is essentially free of external loads, e.g. due to the machining of a workpiece or the like, in particular thus a state wherein the tool is not yet or at least not yet essentially in engagement with a workpiece to be machined. It is advantageous to disregard a state at least shortly or immediately after the machine tool is switched on, sometimes delayed by a predetermined period of time, for example from 0.1 to 0.9 seconds at the time of switch-on, in particular by a switch-on peak of the physical characteristic, for the subsequent analysis or assessment of the physical characteristic for the formation, in particular for the ascertaining and definition of a base value or threshold of a physical characteristic.

It is proposed that in at least one method step, a base value is ascertained from the detected physical characteristic by means of an analysis unit, in particular the control or regulating unit. This is in particular an idle value, advantageously an idle average value of the physical characteristic in the state with a throttled movement, in particular essentially load-free movement state of the machine tool. A base value can also be a base value range that differs from other ranges. Depending on the base value ascertained, a threshold deviating from it is ascertained, in particular a threshold of the physical characteristic deviating from the base value as a percentage or absolute value, preferably a threshold above or below the base value, preferably a scraping threshold, of the physical characteristic. This is defined as the threshold or scraping threshold. In particular, "defining" should be understood that the ascertained or calculated threshold is stored or saved in at least one buffer and/or the control or regulating unit. The threshold or scraping threshold can also be a value range that differs from other value ranges. The ascertaining or calculation is advantageously carried out by the control or regulating unit. The ascertaining method or definition method can be advantageously set by a user, for example by specifying a sensitivity or delay or a percentage or absolute value deviation of the threshold from the ascertained base value. When an overshoot or undershoot of the ascertained or defined threshold is detected, preferably during further operation of the machine tool, a drive unit of the machine tool is set to an operating state under load or load mode movement state, in particular by means of the detection unit, preferably by means of the control or regulating unit, or the machine tool is accelerated to this state.

The fact that the physical characteristic is detected, in particular each time the machine tool is switched on, so to speak again and again, in idle mode, in particular in idle mode with a throttled movement, means that the detection is adaptively adjusted to the specific application and/or the application conditions. Advantageously, the physical characteristic is detected immediately or at least briefly, in particular within seconds or milliseconds after the machine tool is switched on or before the machine tool is in the load mode. The measurement or base value and/or threshold ascertaining can also be repeated continuously, in particular as long as no threshold is detected, for example if the machine tool is operated in idle mode with a throttled movement over a longer period of time. The threshold can sometimes be replaced or overwritten by the newly ascertained threshold.

The quality of the gentle start-up can be increased. Cutting quality and ultimately user-friendliness and customer satisfaction can be increased. Advantageously, an improved gentle start-up can be achieved independently of the tool used, in particular the insert tool used, a selected setting, e.g. oscillation level, the lubrication state or the internal resistances of the machine tool or the battery and/or the like. The tool used can therefore have different properties, for example properties such as weight, material, length, width, thickness, diameter, shape, saw teeth, ribs, recesses, indentations or embossments and/or the like, which have an effect on the size of the detectable physical characteristic. The gentle start-up can thus be adaptively or automatically optimized for or adapted to different tools with different properties or for different states of the machine tool.

The analysis unit is in particular the control or regulating unit of the machine tool, but can also be formed by an external unit, e.g. a smartphone or mobile terminal or the like, in particular which is in wireless or wired communication with the control or regulating unit of the machine tool. A "control or regulating unit" is to be understood in particular as a unit with at least one control or regulating electronics. The term "control electronics" refers in particular to a unit with a processor unit and a memory unit as well as an operating program stored in the memory unit. The detection of an overshoot or undershoot of the ascertained or defined threshold, in particular a threshold ascertained with the processor unit and at least temporarily stored in the memory unit, can take place in the event of a single overshoot or undershoot, in the event of an overshoot or undershoot over a period of time that can advantageously be set automatically or manually, or a number of measurements or detections or the like, that can advantageously be set. The external unit also advantageously has a processor unit with a memory unit and an operating program stored in the memory unit.

The operating state under load or load mode movement state or also working operating state can in principle assume different load or working levels, in particular load or working levels that can be set or preset by a user, in particular load or working levels that can be set by an operator. It typically differs from the operating or movement state with a throttled movement in terms of the movement speed, in particular of the drive unit, the drive train and/or the output of the machine tool or tool. In the state with a throttled movement, a drive, output and/or tool speed or a rotational speed or stroke rate of the machine tool is generally lower, advantageously by a multiple, than in the load mode movement state. For example, a jigsaw, here as an example of a machine tool, has 1-10 load mode rotational speed levels, corresponding to a stroke rate of 800 and 3800 strokes per minute. The drive rotational speed of the drive motor is typically higher due to the transmission through a gearbox in a defined ratio—for example 5 to 10 times higher, in particular 7.5 times higher. In particular, the stroke rates can be set. A stroke rate with a throttled movement could be 500-800 strokes/min, for example. It is therefore possible that the idling rotational speed or idling stroke rate may also correspond to a load mode rotational speed or load mode stroke rate in exceptional cases. An operating state under load could then be the provision of a higher load or a higher current relative to idle mode in order to be able to carry out activities against a greater resistance or at a higher feed rate than in idle operating state. However, a rotational speed, stroke rate and/or the drive, output and/or tool speed of the machine tool is typically increased to a working setpoint in the load mode movement state. The load mode movement state is advantageously intended to enable rapid or optimum work progress in the workpiece—in particular depending on the cutting quality desired by the user. In the state with a throttled movement, a workpiece can be scratched advantageously, in particular without causing a strong tear-out, e.g.

of material on the workpiece surface, and/or simply to ensure that, for example, the cut is made at the desired location, e.g. the location marked on the workpiece and not next to it.

It is proposed that in the ascertaining of the threshold or base value of the physical characteristic, or in the ascertaining of the scraping threshold, a switch-on period of the machine tool is not taken into account, in particular a period of 1-1000 ms, advantageously 100-500 ms, in particular around 300 ms after the machine tool is switched on is not taken into account. A switch-on period is to be understood as a period of time from the switch-on time of the machine tool, i.e. from which, for example, a user switches on the machine tool in such a way that the drive unit of the machine tool is activated, in particular is set in motion, or a tool of the machine tool is set in motion by the drive unit of the machine tool. In particular, the detected data or the measurement signal of the physical characteristic of the switch-on period for ascertaining the threshold and/or the base value are not taken into account and/or are not recorded at all. This has the advantage of increasing the accuracy of the base value formation. In particular, falsification of the base value or base average value is avoided, e.g. by excluding inrush current peaks. This is because the physical characteristic can be relatively volatile immediately after switch-on or during the switch-on period and/or include disturbance variables or distortions that would not be conducive to precise base value or threshold formation if they were also taken into account. Alternatively and/or additionally, however, only a switch-on period could be taken into account, especially if a physical characteristic typical for the formation of the base value can be derived from it.

It is proposed that a detection period of the physical characteristic of 10-1000 ms, advantageously 250-750 ms, in particular around 500 ms, is taken into account when or for ascertaining the threshold or base value, in particular for forming a base average value, in particular immediately after the end of a switch-on period, advantageously starting after 100-500 ms, in particular starting after around 300 ms from the time the machine tool is switched on. The average value can also be ascertained as a moving average or using other methods. Advantageously, the physical characteristic is relatively constant after the switch-on period and can therefore be ascertained with less volatility and/or without high changes or disturbance variables. This increases the precision when ascertaining the base value and consequently determining and defining the threshold. Finally, user-friendliness is increased when using the machine tool.

It is proposed that the advantageously essentially load-free, idle mode movement state of the machine tool with a throttled movement, advantageously for a reciprocating saw, in particular a jigsaw, corresponds to a setpoint rotational speed of the drive unit of 2000 to 10000 rpm, or corresponds to an oscillation or stroke rate of an output unit or tool holder of 250 to 1000 oscillations or strokes per minute, in particular of 500-800 strokes/min, and/or the load mode movement state corresponds to a setpoint stroke rate of the output or the tool holder of advantageously 800 to 3800 strokes/min, in particular presettable in several, advantageously 2-10 levels of rotation or stroke rates.

It is proposed that when idling of the machine tool is detected in the load mode movement state, for example by a typical change in the detected physical characteristic, in particular reduction or increase of the physical characteristic relative to the load mode, in particular reduction of the motor or battery current, in particular over a minimum detection period that can advantageously be set, the machine tool is set to a movement state with a throttled movement, advantageously the idle mode movement state with a throttled movement is reset. This reduces the rotational speed, stroke rate and/or drive, output and/or tool speed of the machine tool, in particular to the original value of the idle mode movement state with a throttled movement. A new base value and/or threshold ascertaining can advantageously be carried out and the previously ascertained and defined threshold can be adapted or overwritten on the basis of this, in particular in order to enable a new or optimized, in particular adaptive gentle start-up, regardless of, for example, changed internal resistances, e.g. due to heating of the machine tool or the power supply device. However, the previously ascertained or defined threshold can also be used again. Idling in the load mode movement state typically occurs after a load mode movement state with increased rotational speed or tool speed after the machine tool has been set down from the workpiece, e.g. after a cut or work process has been completed. If the user does not switch off the machine tool until the next operation, this reduction is also advantageous at least for the energy consumption and/or the load on the machine tool. This can reduce the load on the machine tool, in particular increase its service life and/or reduce energy consumption and/or, above all, maintain the precision of the gentle start-up even without switching off the machine tool over a number of operations, in particular maintain it automatically.

Furthermore, a machine tool is proposed, in particular a hand-held machine tool, advantageously a reciprocating saw, preferably a jigsaw, reciprocating saw or an oscillating multifunction tool, which is set up to carry out the aforementioned method. The machine tool comprises at least one drive unit. It comprises at least one control or regulating unit at least for controlling or regulating the drive unit, advantageously for controlling or regulating the gentle start-up. It also has a tool holder. This is advantageously driven via a drive train, in particular comprising the components from the drive unit to the tool holder, for example comprising a gearbox. The machine tool advantageously has a communication module to communicate with an external unit, in particular the function interface and/or the Internet. The machine tool is advantageously a battery-powered hand-held machine tool. Advantageously, the machine tool has a detection unit for time-dependent detection of a physical characteristic of the machine tool, preferably for time-dependent detection of a motor current, battery current and/or a motor rotational speed or movement characteristic of the drive unit. This detection unit is in particular the control or regulating unit of the machine tool, advantageously also functioning as an analysis unit.

Furthermore, a system is proposed comprising a machine tool, in particular a hand-held machine tool, advantageously a reciprocating saw, preferably a jigsaw, reciprocating saw or oscillating multifunction tool, and comprising an external unit. In particular, the external unit is designed as a functional interface or has one. In particular, it is a mobile terminal device comprising an application program set up to at least partially enable a configurable gentle start-up of the machine tool, for example a smartphone. The machine tool is advantageously set up to perform an adaptive gentle start-up. Advantageously, the machine tool and the functional interface or external unit are connected to each other, for example via a communication module. The machine tool and external unit or functional interface are advantageously set up to carry out the method for adaptive and/or configurable gentle start-up.

In the following, a method is proposed wherein the gentle start-up can be configured by a user of the machine tool. Method steps or features of this configurable gentle start-up can be advantageously combined with features of the previous, in particular adaptive gentle start-up, but can also be independent of it. Both the adaptive and the configurable gentle start-up are particularly advantageous for machine tools without manual throttle switches, i.e. for machine tools with an on/off switch and possibly a setting means or wheel or a comparable device for preselecting operating levels or setpoint operating parameters, in particular setpoint rotational speed levels. This is because a gentle start-up cannot be controlled or regulated manually by operating a variable throttle switch. Rather, the gentle start-up takes place "automatically", in particular at least indirectly controlled or regulated by the control or regulating unit of the machine tool.

A method is proposed for operating a machine tool with a gentle start-up, in particular a hand-held machine tool, advantageously with an oscillating output movement, for example a reciprocating saw, preferably a jigsaw, reciprocating saw or an oscillating multifunction tool, wherein the machine tool is operated in at least one method step in a state or operating state with a throttled movement, advantageously idle operating state, and in a further method step, a drive unit of the machine tool is automatically accelerated to an operating state under load or load mode movement state when an overshoot or undershoot of a scraping threshold is detected, in particular by a control or regulating unit of the machine tool.

It is proposed that the gentle start-up can be configured by a user of the machine tool. Configurable is understood to mean, in particular, changeable or customizable. Setting or configuration tools are provided for this purpose. These can be provided on the machine tool and/or an external unit that is intended for communication with the machine tool. The gentle start-up can be configured, modified or adapted to the machining conditions and/or properties of the workpiece to be machined and/or to the needs of the user. The advantage of this is that a gentle start-up adapted to the material to be processed or the desired cutting quality can be provided. Materials such as soft polystyrene or balsa wood or hard metal or solid wood, as well as workpiece geometries, e.g. thick or thin workpieces, can be machined effectively with gentle start-up thanks to the configurable gentle start-up, in particular because the machine tool does not accelerate too early, too late or not at all to a load mode movement state. It can be adapted, for example, to an angle of attack of a saw blade, e.g. resulting from a pendulum stroke setting, or adapted to a material hardness or material thickness of a workpiece, or adapted to a feed rate exerted on the machine tool, and/or the like, not accelerated too early or too late or not at all to a load mode, but advantageously exactly on time. If, for example in the case of a jigsaw, the saw blade is not vertical to the stroke axis or the workpiece contact surface, but the saw blade tip or the saw tooth row is inclined in the feed direction—e.g. due to the design or during pendulum operation—the gentle start-up can be configured so that the saw blade or the machine tool is not accelerated to load mode when it first scratches the underside of the workpiece, although the user does not yet detect any contact with the material on the upper side of the workpiece, but advantageously only later, i.e. when the saw blade has penetrated the workpiece on both the underside and the upper side of the workpiece. Alternatively, the same applies to jigsaws comprising saw blades with a negative angle of attack, i.e. with a blade tip or saw tooth row that is inclined against the feed direction in relation to the stroke axis. Acceleration to load mode can therefore take place with a delay, even though a detection unit or a control or regulating unit has already detected a scratch. The configurable gentle start-up can therefore delay the acceleration time from idle mode with a throttled movement to load mode or only take place when an increased force threshold is overshot and/or with an adapted acceleration function.

In this case, a drive rotational speed or tool speed of the machine tool would therefore not be increased too early.

Alternatively, with a thin and soft material, such as polystyrene or balsa wood, the gentle start-up could be configured or preset in such a way, in particular set so sensitively, that it reliably switches to load mode despite a low load on the saw blade, which would otherwise not be sufficient to overshoot the scraping threshold, and a rotational speed of the drive unit or stroke rate of the reciprocating saw could be increased accordingly. However, if the material is hard, such as metal, or if the workpiece is a thick hardwood or solid wood panel, the configurable gentle start-up prevents premature transfer to load mode.

It is proposed that the gentle start-up of the machine tool can be configured via a functional interface, advantageously an HMI, in particular a functional interface arranged on the machine tool and/or on an external device. For example, the functional interface and/or the external unit can be connected to the machine tool by wire or, advantageously, wirelessly, in particular to the control or regulating unit of the machine tool. In particular, the gentle start-up can be configured via a corresponding application program (app) executed on the external unit or a mobile end device, for example on a smartphone or tablet. This can increase user comfort.

Advantageously, a function interface, in particular with reduced setting options, can be arranged on the machine tool and a function interface, in particular with more extensive setting options, can be arranged or executed on an external device that is connected to the machine tool. For example, the gentle start-up can be configured for individual operating levels on the external device; these operating levels, e.g. 1 to 6, can then be activated or selected at the function interface of the machine tool with the gentle start-up configured. Advantageously, the function interface of the machine tool also displays whether the gentle start-up is activated for the respective operating level, and/or further properties of the configured gentle start-up are sometimes displayed for the respective operating level or can be selected or set.

It is proposed that the gentle start-up of the machine tool can be set and/or switched on or off for different working setpoints or different operating states under load, for example different setpoints of a drive rotational speed of the machine tool, stroke rate and/or drive, output and/or tool speed of the machine tool, advantageously jointly settable and/or switchable on or off for several or optionally individually for each working setpoint. This can increase user-friendliness.

It is proposed that a period for acceleration to the load mode movement state, in particular an acceleration period and/or a start of acceleration from detection of an overshoot or undershoot of the scraping threshold, in particular a delay period, can be set. In particular, the setting can be made on a relative, percentage or absolute value basis. Advantageously between a selectable or fixed time period, e.g. from 0 to 2 sec. In particular, the acceleration period and/or delay period can be changed continuously or in steps, for example in steps of 0.1 sec, in 5% steps or the like. Setting is advantageously made jointly for several or optionally individually for each working setpoint or load mode movement state and/or can be switched on or off for each working setpoint or load mode movement state. The usability of the gentle start-up for different materials and/or operating conditions can be increased. The delay enables the user, for example, to complete a cut at the edge of the workpiece with a throttled movement and only accelerate to load mode when the workpiece is sufficiently deep. The acceleration period allows the user to accelerate quickly or slowly to load mode, for example. Above all, this means that requirements for workpiece processing and/or working conditions and/or workpiece or tool properties can be addressed in a differentiated manner.

It is proposed that an acceleration curve, in particular an acceleration function, can be set, in particular having a linear, exponential, root function or function with a saddle point. This means that the gentle start-up can be configured even better depending on the application. This also increases the machine tool's adaptability for a wide range of applications.

It is suggested that a sensitivity of the gentle start-up can be set. In particular in the form of a height or duration of an overshoot or undershoot of the scraping threshold and/or by measuring a number of measured values above or below a scraping threshold. And/or in the form of a deviation of the scraping threshold from the base value. And/or in the form of a value range of the scraping threshold or base values. Sensitivity can, for example, be set by a relative specification at the function interface, for example by gradually selecting between light or heavy or fast and slow. A control or regulating unit can, for example, convert this into a corresponding percentage or absolute value deviation of the scraping threshold from an advantageously detected and ascertained base value of a physical characteristic of the machine tool. For example, a user can set a sensitivity by specifying a relative value of a deviation of the scraping value from a base value or the like, from low to high, or as a percentage, that can advantageously be set in 1% steps, for example, from 2.5% to 60%, in particular from 5% to 30% of the base value, and/or by specifying an absolute value of deviation, for example a motor current threshold range of 0.25 A to 5 A from a base motor current value or base motor value range, advantageously 0.5 A to 3 A, in particular settable in 0.1 A steps. The scraping threshold and base value are also to be understood as value ranges. This also means that thick, thin, soft or hard workpieces, e.g. metal, versus balsa wood or hardwood, can be processed. The machine can machine the pressboard even more efficiently with a gentle start-up, in particular because the machine tool does not accelerate too early, too late or not at all to a load mode movement state.

It is proposed that a sensitivity for detection or analysis of a physical characteristic typical for the gentle start-up can be set, for example by specifying a ascertaining method for forming a threshold, in particular by selecting the averaging method, for example by forming the moving average, the period for averaging the detected values of the physical characteristic or the like.

In addition, a combination of at least two or more of the proposed gentle start-up configurations is advantageously proposed, in particular a setting jointly for several or optionally individually for each working setpoint of, for example: The gentle start-up can be switched on or off, the acceleration period and/or delay period or an acceleration curve for the operating state under load and/or a sensitivity of the adaptive gentle start-up, in particular when a physical characteristic is detected and/or for the percentage or absolute value deviation of a scraping threshold from a base value.

In the following, a functional interface, in particular an HMI, or a computer program for the functional interface, in particular a mobile terminal device, is proposed, which is set up to enable a configurable, advantageously adaptive, gentle start-up of a machine tool by a user, advantageously the aforementioned adaptive and/or configurable gentle start-up. The machine tool is advantageously a hand-held machine tool, in particular a reciprocating saw, preferably a jigsaw, reciprocating saw or an oscillating multifunction tool. The functional interface comprising means for setting and/or switching on or off the gentle start-up for different operating levels, working setpoints and/or operating states under load, advantageously different setpoints of a drive rotational speed, stroke rate and/or drive, output and/or tool speed of the machine tool, advantageously comprising means for setting and/or switching on or off the gentle start-up jointly for several or optionally individually for different operating levels, working setpoints and/or operating states of the machine tool under load. The functional interface is advantageously arranged on or formed by an external device or the machine tool, advantageously at least partially arranged or formed on both. In particular, it can be a smartphone or tablet with a user interface and an application program that is set up to enable the configurable gentle start-up. The external device, in particular the smartphone or tablet, is at least indirectly connected to the machine tool, in particular a control or regulating unit of the machine tool, in particular for data exchange, advantageously of input and output data. In principle, it can be connected to the machine tool wirelessly, but it can also be wired. It can advantageously be coupled or connected wirelessly to a communication module of the machine tool or is connected to the machine tool via it. It is used to transmit and/or receive data or to exchange data, in particular with an external unit.

The means for setting and/or activating or deactivating the gentle start-up can include switching, adjusting and/or operating elements. Graphical input and output elements are advantageously provided for interaction with a user. In particular, they are shown on a display and are at least partially provided by an application or control or regulating program that is executed on the functional interface and/or the external unit or device or the control or regulating unit. The application program can also be executed at least partially on a control or regulating unit of the machine tool. The functional interface is advantageously provided for data processing, in particular comprising means for executing a method for enabling the configurable gentle start-up. Also proposed is a computer program comprising instructions which, when the program is executed by a computer, cause the computer to execute the method for enabling the configurable gentle start-up.

It is proposed that a number of operating levels, working setpoints and/or operating states under load can be selected and/or a working setpoint can be set or selected between a predetermined maximum and minimum value for the working setpoint. In particular, the function interface comprises means so that a number of different operating levels, working setpoints and/or operating states under load can be selected and/or a working setpoint can be set or selected between a predefined maximum and minimum value for the working setpoint. This makes it easy to make individual gentle start-up settings for different operating or working setpoints of the machine tool. Time can be saved when changing operating levels, especially when changing operating levels directly on the machine tool, which are already preconfigured with regard to the gentle start-up.

It is proposed that an acceleration period and/or delay period for displacing the machine tool, in particular from detection of an overshoot or undershoot of a scraping threshold (172), in particular from an idle operating state (144) with a throttled movement, into an operating state under load from detection of an overshoot or undershoot of a scraping threshold can be set, in particular as a relative value, e.g. slow, quick, and/or as a percentage or as an absolute value, advantageously between 0 and 2 sec. The acceleration period is a period of time for acceleration from an, in particular idle operating state with a throttled movement to a working setpoint and/or operating state under load. A delay period is the period of time between the start of an acceleration to a working setpoint and/or load mode movement state from the detection of an overshoot or undershoot of a scraping threshold. The acceleration and/or delay period can be set continuously or in steps of e.g. 0.1 sec. The setting is advantageously made jointly for several or optionally individually for each working setpoint and/or load mode movement state or can be switched on or off. This makes it possible to improve the cutting quality, in particular the tear-out behavior, depending on the workpiece material used and/or other properties influencing the gentle start-up.

It is proposed that an acceleration curve, in particular an acceleration function, can be set or selected, in particular by selecting corresponding graphical or descriptive symbols, for example comprising a selection of a linear, exponential, root function or saddle point function of the acceleration curve, advantageously jointly for several or optionally individually for each operating level, working setpoint and/or load mode movement state. In particular, the function interface includes setting or selection means for this purpose. This can improve the tear-out behavior depending on the workpiece geometry used, its material or other properties.

It is proposed that a sensitivity of the gentle start-up can be set, in particular in the form of a duration of an overshoot or undershoot of a scraping threshold and/or a specification of a relative sensitivity of the gentle start-up. For example, the possibility of setting can be achieved by relative, percentage or absolute deviation of a scraping threshold from a base value of a physical characteristic of the machine tool, in particular in an, advantageously idle operating state of the machine tool with a throttled movement. It can be carried out by specifying the relative sensitivity, e.g. from low to high, or by specifying a deviation of the scraping threshold from a favorably detected base value. It can also be carried out by specifying an absolute value of deviation, for example a motor current threshold of 0.25 A to 5 A from a base motor current value, advantageously 0.5 A to 3 A, in particular settable in 0.1 A steps. In particular, the functional interface comprises setting means, e.g. haptic or optical control or setting sliders or the like. The term "value" should also include a value range here.

It is proposed that a sensitivity for detection or analysis of a physical characteristic typical for the gentle start-up can be set, for example by specifying an ascertaining method for forming a threshold, in particular by selecting the averaging, for example by selecting the averaging method, e.g. by forming the moving average, specifying a time period for averaging the detected values of the physical characteristic, or the like.

Advantageously, two, advantageously three, preferably four or five of the aforementioned setting options of the configurable gentle start-up can be selected at the function interface, for example to enable an optional setting, advantageously an optional setting per working setpoint, of at least two functions in combination, i.e. the ability to switch the gentle start-up function on or off, the time for increasing or the course for increasing the motor current, the load, the rotational speed, the stroke rate and/or the drive, output and/or tool speed to the working setpoint and/or the sensitivity for detecting the physical characteristic or the percentage of the working setpoint.

Furthermore, a functional interface is proposed which comprises at least one, advantageously several, of the following further display, selection and/or setting options:

- a connection state of an external device providing the functional interface with the machine tool and/or an activation or deactivation of a connection with the machine tool;
- a name, a property and/or a state of the machine tool;
- a selection option for a number of operating and/or setpoint rotational speed levels available on the function interface and/or a function interface of the machine tool, in particular wherein a changeability of these available operating and/or setpoint rotational speed levels can be blocked;
- a display and/or setting options for a setpoint rotational speed per operating level; activation or deactivation of the gentle start-up at least for one, in particular several, advantageously all setpoint rotational speeds and/or operating levels; a sensitivity and/or a delay period of the gentle start-up, in particular jointly for all setpoint rotational speeds and/or operating levels, alternatively also optionally individually for each setpoint rotational speed and/or operating level;
- a kickback or drop shutdown for the machine tool;
- a machine light setting option, in particular for switching on and off, setting the brightness and/or activating/deactivating a stroboscope mode;
- a property, in particular a brightness or button assignment of a function interface directly on the machine tool, in particular an HMI on the machine tool;
- a level indicator for the battery or battery pack of the machine tool.

It is proposed that the function interface comprises at least one optical setting slider, in particular displayed on a touchscreen surface, which is designed to be displaceable between a minimum and a maximum setpoint, in particular for defining a drive rotational speed, the sensitivity of the gentle start-up and/or a delay period, in particular a delay period for accelerating the machine tool to load mode after detecting an overshoot or undershoot of a scraping threshold.

It is proposed that, at least when a gentle start-up is activated, a symbol for setting further properties of the gentle start-up appears on the function interface, in particular for setting further properties of the gentle start-up, for example in a submenu of the application program, advantageously with regard to a setting of the sensitivity and/or the delay period, advantageously displayed on the function interface, in particular based on the execution of an application program.

The output of at least one signal when the (scraping) threshold is overshot and/or during the detection/ascertaining of the base value and/or threshold is proposed, in particular an acoustic, optical and/or haptic signal, for example a signal output by the machine tool or the function interface.

It is proposed that after the machine tool has been switched off and switched on again within a minimum rest period, the machine tool is immediately set to a load mode movement state, in particular the load mode movement state that can advantageously be set. On the other hand, once the minimum rest period has been overshot, the machine tool is initially operated again with gentle start-up, i.e. in the idle operating state with a throttled movement until a scraping threshold is overshot. Sometimes the user stops the machine tool in the middle of machining a workpiece or switches it off, e.g. to regrip or similar, and can continue machining without gentle start-up after restarting the machine tool. As such "processing pauses" are often shorter than a specified minimum rest period, this functionality can increase user-friendliness. It can also be advantageous to set the minimum rest period.

A method is proposed for operating a machine tool (10) with a gentle start-up, in particular a hand-held machine tool (12), advantageously with an oscillating or stroke-shaped output movement (14), for example a reciprocating saw (16), preferably a jigsaw (18), a reciprocating saw or an oscillating multifunction tool (19), wherein in at least one method step (140) at least one physical characteristic (142) of the machine tool (10), in particular a motor and/or battery current (24) of the machine tool (10), is detected during an idle operating state (144) of the machine tool (10) with a throttled movement, by means of a detection unit (22), in particular a control or regulating unit (20) of the machine tool (10), characterized in that, in at least one further method step (140), at least one physical characteristic (142) of the machine tool (10), in particular a motor and/or battery current (24) of the machine tool (10), is detected by means of an analysis unit (152), in particular the control or regulating unit (20) of the machine tool (10), a threshold (172) of the physical characteristic (142), in particular a scraping threshold, is ascertained on the basis of the detected physical characteristic (142), and in that, in the further operation of the machine tool (10), when an overshoot or undershoot of the ascertained threshold is detected, at least one drive unit (40) of the machine tool (10) is set to an operating state (184) under load, in particular with an increased movement speed relative to the idle operating state (144) with a throttled movement.

It is proposed that the threshold (172) is ascertained by using the analysis unit (152) to ascertain a base value (154) from the detected physical characteristic (142), in particular a base average value, and, as a function of the ascertained base value (154), a threshold (172) deviating therefrom, advantageously a threshold (172) deviating from the base value (154) as a percentage or absolute value, is ascertained, in particular calculated.

It is proposed that when ascertaining the threshold (172) or the base value (154), a switch-on period (156) of the machine tool (10) is not taken into account, in particular a period of 1-1000 ms, advantageously 100-500 ms, in particular around 300 ms from a switch-on time (158) of the machine tool (10).

It is proposed that when ascertaining the threshold (172) or the base value (154), a detection period (160) of the physical characteristic of 10-1000 ms, advantageously 250-750 ms, in particular around 500 ms, is taken into account, in particular immediately after the end of a switch-on period (156), advantageously starting after 100-500 ms, in particular starting after around 300 ms, from the time of a switch-on (158) of the machine tool (10).

It is proposed that the idle operating state (144) of the machine tool (10) with a throttled movement, advantageously of the reciprocating saw (16), in particular of the jigsaw (18), corresponds to a setpoint rotational speed of the drive unit (40) of 2000 to 10000 rpm or to an oscillation or stroke rate of an output unit (36) of 250 to 1000 oscillations or strokes/min, in particular of 500-800 strokes/min, advantageously of around 500 or 800 strokes/min; and/or that the operating state (184) of the machine tool (10) under load, advantageously the reciprocating saw (16), corresponds to a setpoint rotational speed of the drive unit (40) of 6000-30000 rpm or a stroke rate of the output unit (36) of 800 to 3800 strokes/min, in particular presettable in several, advantageously 2-10 operating levels (310).

It is proposed that when idling (186) of the machine tool (10) is detected in the operating state (184) under load, for example by a typical change in the detected physical characteristic (142), in particular a reduction or increase in the physical characteristic relative to the load mode, in particular with workpiece engagement of the tool, advantageously reduction of the motor or battery current (24), in particular over an advantageously minimum detection period that can be set, the machine tool (10) is set to an operating state with a throttled movement, advantageously the idle operating state (144) with a throttled movement is reset.

It is proposed that when the threshold (172) or scraping threshold is overshot and/or during the detection and/or ascertaining (140, 150) of a base value and/or threshold (154, 172), a signal, in particular an acoustic, optical and/or haptic signal, is output, in particular on the machine tool (10), on a functional interface (300, 358) and/or on an external unit (30), for example on an output field (382) of the machine tool (10).

It is proposed that after the machine tool (10) has been switched off and switched on again within a minimum rest period, the machine tool (10) is immediately set to the load mode movement state (184), in particular accelerated, in particular to a variably settable load mode movement state (184), in particular without first being set to the idle operating state (144) with a throttled movement.

Furthermore, a machine tool (10) is proposed, in particular a hand-held machine tool (12), advantageously a reciprocating saw (16), preferably a jigsaw (18), reciprocating saw or oscillating multifunction tool (19), set up to carry out a method as described above.

Furthermore, a system is proposed comprising a machine tool (10), in particular a hand-held machine tool (12), advantageously a reciprocating saw (16), preferably a jigsaw (18), reciprocating saw or oscillating multifunction tool (19) and comprising a functional interface (300) and/or an external unit (30), in particular a mobile terminal device, for example a smartphone (303), in particular with an application program, set up to carry out an aforementioned method.

A method is proposed for operating a machine tool (10) with gentle start-up, in particular a hand-held machine tool (12), advantageously a reciprocating saw (16), jigsaw (18), reciprocating saw or an oscillating multifunction tool (19), in particular wherein at least one drive unit (40) of the machine tool (10), at least after the machine tool (40) has been switched on, is operated in an idle operating state (144) with a throttled movement and subsequently, after a threshold (172), in particular a scraping threshold, of a physical characteristic (142) has been detected as being overshot or undershot, for example a motor current (24), a voltage (146) and/or a rotational speed of the drive unit (40), is automatically transferred to an operating state (184) under load, which is accelerated relative to the idle operating state (144) with a throttled movement, characterized in that the gentle start-up of the machine tool (10) can be configured, in particular by a user of the machine tool (10), in particular via a function interface (300, 358), advantageously, an HMI (302), in particular a functional interface (300) formed on the machine tool (10) and/or on an external device (301), in particular in that the gentle start-up can be configured for different working setpoints (312) or different operating states (314) under load, for example different setpoints (312) of a drive rotational speed of the machine tool (10), a stroke rate and/or a drive, output and/or tool speed of the machine tool (10), can be set and/or switched on or off, advantageously can be set and/or switched on or off jointly for several or optionally individually for each working setpoint.

It is proposed that a period for acceleration to the operating state (184) under load, in particular an acceleration period (326) and/or a start of acceleration, in particular a delay period (328), can be set, in particular as a relative value, from detection of a threshold or scraping threshold (172) being overshot or undershot, or as a percentage or as an absolute value, advantageously between 0 and 2 sec, in particular continuously or in steps of 0.1 sec or 5% steps between 0 and 100% corresponding to 0 to 2 sec, and advantageously together for several or optionally individually for each working setpoint (312), and/or can be switched on or off.

It is proposed that the course of the acceleration (330), in particular an acceleration function (332), can be set, in particular having a linear (202), exponential (204), root function (206) or function with a saddle point (208).

It is proposed that a sensitivity (334) of the gentle start-up can be set, in particular in the form of a duration of an overshoot or undershoot of the threshold or scraping threshold (172) and/or a number of measurements above or below the threshold and/or a specification of a relative value, percentage or absolute value of the deviation (174) of the threshold (172) from an advantageously detected or ascertained base value (154) of a physical characteristic (142) of the machine tool (10), for example by specifying a relative value from low to high or specifying percentage of a deviation (174) of the threshold (172) from a base value (154), for example from 2.5% to 60%, in particular from 5% to 30% of the base value, advantageously settable in 1% steps and/or by specifying an absolute value of the deviation, for example of a motor current threshold of 0.25 A to 5 A from a base motor current value, advantageously 0.5 A to 3 A, in particular settable in 0.1 A steps.

It is proposed that a sensitivity for detection or analysis of a physical characteristic (142) typical for the gentle start-up can be set, for example by specifying an ascertaining method for forming a threshold (172), in particular by selecting the averaging, for example by forming the moving average, of the period for averaging the detected values of the physical characteristic.

It is proposed that when the threshold (172) or scraping threshold is overshot and/or during the detection and/or ascertaining (140, 150) of a base value and/or threshold (154, 172), a signal, in particular an acoustic, optical and/or haptic signal, is output, in particular on the machine tool (10), on a functional interface (300, 358) and/or on an external unit (30), for example an output field (382) on the machine tool (10).

It is proposed that after the machine tool (10) has been switched off and switched on again within a minimum rest period, the machine tool (10) is immediately set to the load mode movement state (184), in particular accelerated, in particular to a load mode movement state (184) that can be set, in particular without first being set to the idle operating state (144) with a throttled movement.

A functional interface (300, 358), in particular an HMI (302), is proposed, set up to enable a configurable, advantageously adaptive gentle start-up of a machine tool (10) by a user, in particular comprising means for setting (304, 306) and/or switching on or off (308) the gentle start-up for different operating levels (310), working setpoints (312) and/or operating states (314) of the machine tool (10) under load, advantageously different setpoints of a drive rotational speed (312), stroke rate and/or drive, output and/or tool speed of the machine tool (10), advantageously comprising means for setting (304, 306) and/or switching on or off (308) the gentle start-up jointly for several or optionally individually for different operating levels (310), working setpoints (312) and/or operating states (314) of the machine tool (10) under load.

It is proposed that a number of different operating levels (310), working setpoints (312) and/or operating states (314) under load can be set and/or selected and/or a working setpoint (312) can be set or selected between a predetermined minimum and maximum value (323, 325) for the working setpoint (312).

3 It is proposed that an acceleration period (326) and/or delay period (328) for moving the machine tool (10) into an operating state (184) under load from detection of an overshoot or undershoot of a threshold (172), in particular a scraping threshold, can be set or selected, in particular can be set or selected as a relative value, as percentage or as an absolute value, advantageously between 0 and 2 sec, advantageously can be set or selected jointly for several or optionally individually for each working setpoint (312) and/or operating state (314) under load.

It is proposed that an acceleration curve (330), in particular an acceleration function (332), can be set or selected for moving the machine tool (10) into an operating state (184) under load, in particular after an overshoot or undershoot of the threshold (172) has been detected, in particular having a linear (202), exponential (204), root function (206) or function with a saddle point (208), advantageously settable or selectable jointly for several or optionally individually for each operating level (310), working setpoint (312) and/or load mode movement state (314).

5. Function interface (300, 358) according to one of the preceding claims, characterized in that a sensitivity (334) of the gentle start-up can be set or selected, in particular in the form of a duration of an overshoot or undershoot of a threshold (172) and/or by specifying a relative value, percentage or absolute value of deviation (174) of a threshold (172) from a base value (154) of a physical characteristic (142), above or below which the machine tool (10) is set to load mode.

It is proposed that a sensitivity for detection or analysis of a physical characteristic (142) typical for the gentle start-up can be set or selected, for example by specifying an ascertaining method for forming a base value or threshold (172), in particular by selecting the averaging method of a base value or threshold (172), for example by forming a moving average of detected values of a physical characteristic (142) and/or a period of detection or analysis of values of a physical characteristic (142) for averaging.

It is proposed that, at least when the gentle start-up is activated, a symbol for setting further properties of the gentle start-up appears on the function interface (300), in particular for setting further properties, advantageously a sensitivity and/or a delay period.

It is proposed that the function interface (300, 358) comprises at least one, advantageously several, of the following further display, selection and/or setting options:

a. a connection state (338) of an external device providing the functional interface (300) to the machine tool (10) and/or an activation or deactivation of a connection (318) to the machine tool (10);

b. a name (340), a property and/or a state (342) of the machine tool (10);
c. a selection option (344) for a number of operating and/or setpoint rotational speed levels (310, 312) available on the function interface (300) and/or a function interface (358) of the machine tool (10), in particular wherein a changeability of these available operating and/or setpoint rotational speed levels (310, 312) can be blocked;
d. a display (350) and/or setting options (346) for a setpoint rotational speed (312) for each operating level (310); activation or deactivation (308) of the gentle start-up at least for one, in particular several, advantageously all setpoint rotational speeds (312) and/or operating levels (310); a sensitivity (334) and/or a delay period (328) of the gentle start-up, in particular jointly for all setpoint rotational speeds (312) and/or operating levels (310), alternatively also optionally individually for each setpoint rotational speed (312) and/or operating level (310);
e. a kickback and/or drop shutdown (352) for the machine tool (10);
f. a machine light setting option (354), in particular for switching the machine light on and off and/or setting the brightness of the machine light and/or activating/deactivating a stroboscope mode of the machine light;
g. a property (356), in particular a brightness or button assignment of a function interface (358) directly on the machine tool (10), in particular of an HMI on the machine tool (10);
h. a level indicator (360) of the battery or battery pack (60) of the machine tool (10).

Furthermore, a machine tool (10) is proposed, in particular a hand-held machine tool (12), advantageously a reciprocating saw (16), preferably a jigsaw (18), reciprocating saw or oscillating multifunction tool (19), with an aforementioned functional interface (300, 358).

Furthermore, a system comprising a machine tool (10) and an external unit is proposed, in particular a mobile terminal (30), comprising at least one aforementioned functional interface (300, 358), in particular wherein the at least one functional interface (300, 358), advantageously a functional interface (300, 358) on the machine tool (10) and/or the external unit (30), is/are intended to be connected to a control or regulating unit (20) of the machine tool (10), advantageously, wherein the functional interface (300) is designed as a mobile terminal device, in particular a smartphone (303) or tablet with an app or functional application, and is intended for this purpose. function application and is intended to be wirelessly connected to at least one communication module (62) of the machine tool (10).

DETAILED DESCRIPTION OF THE DRAWINGS

Figure 2:
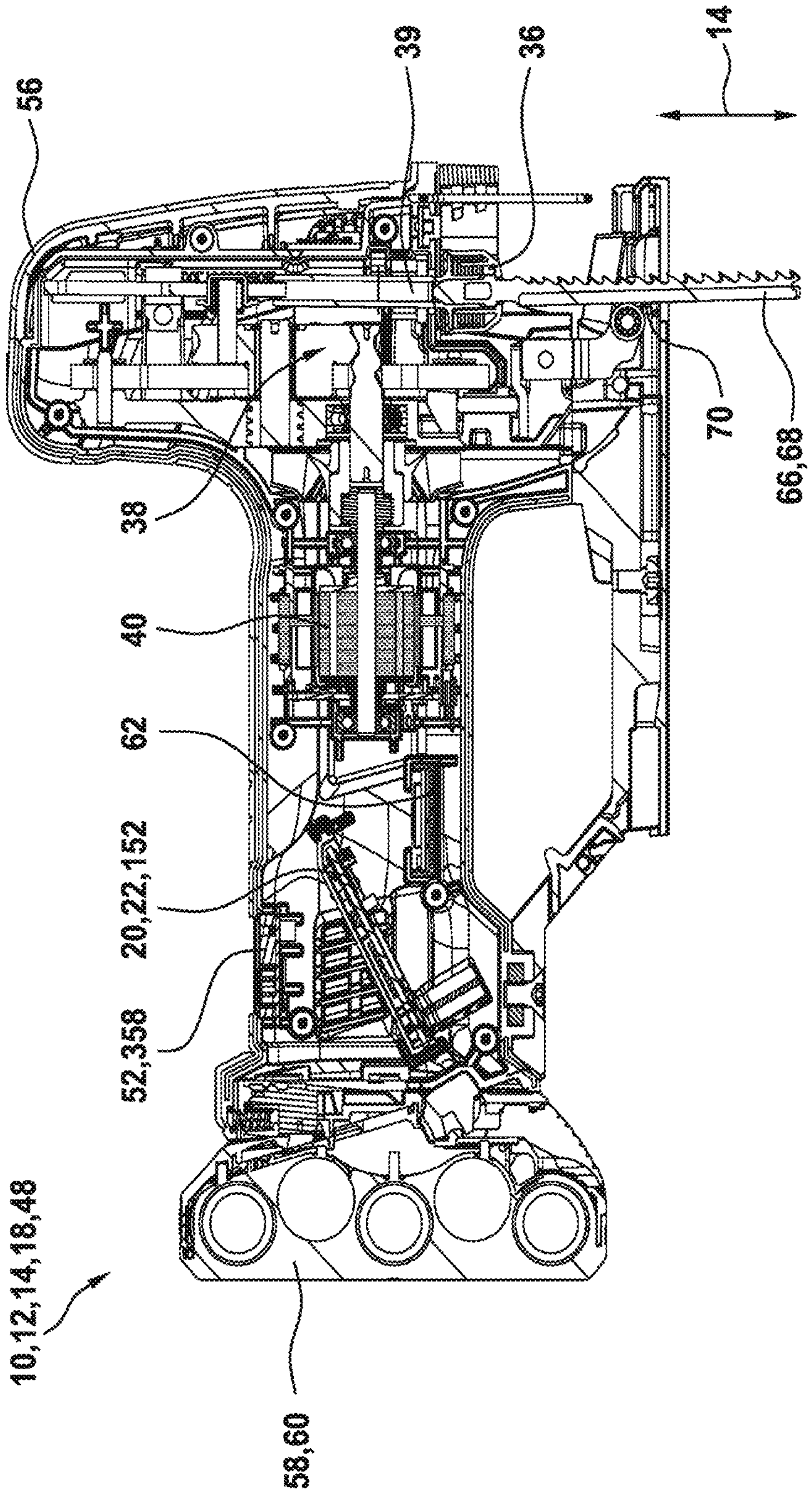
Figure 3:
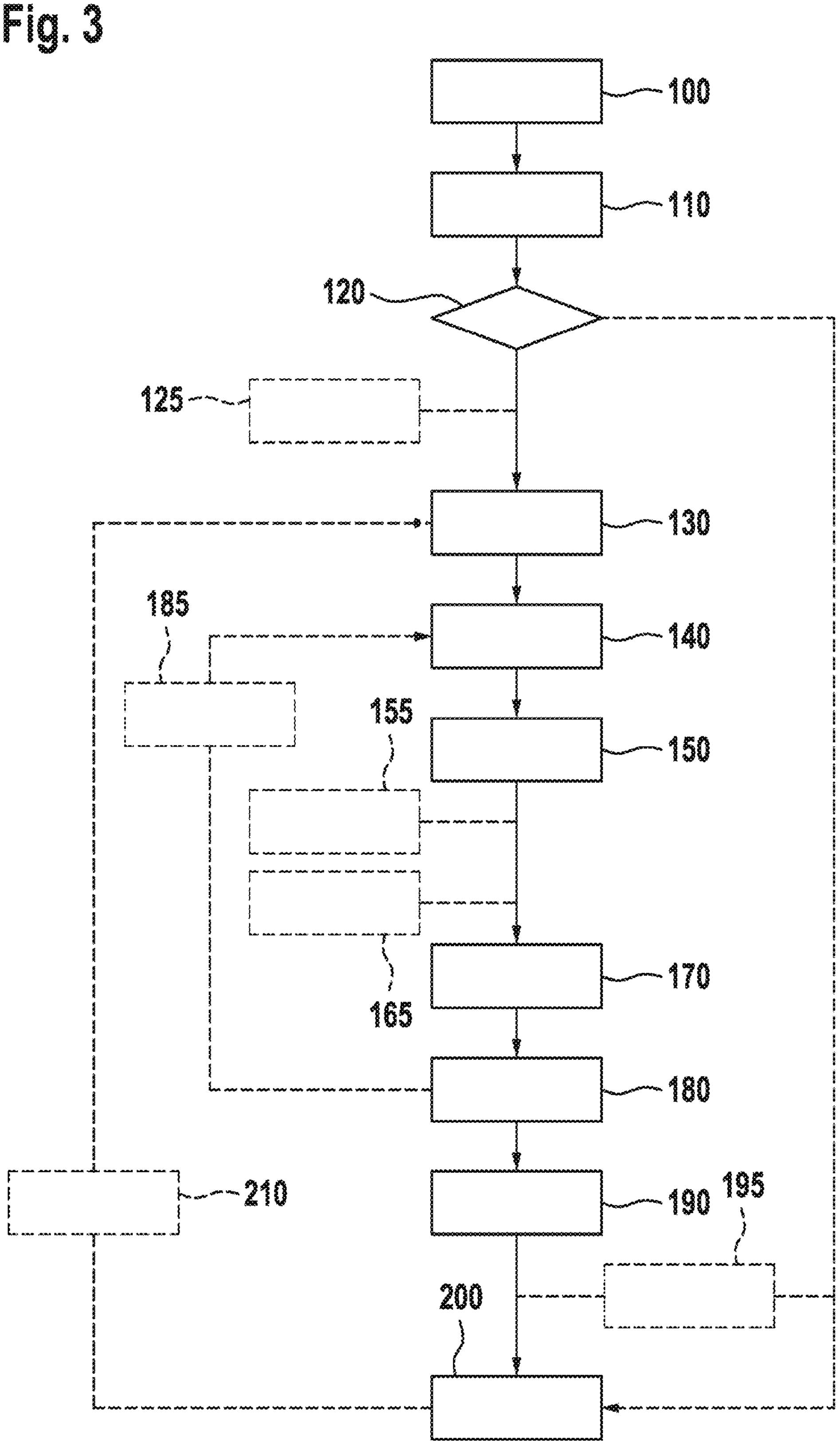
Figure 4:
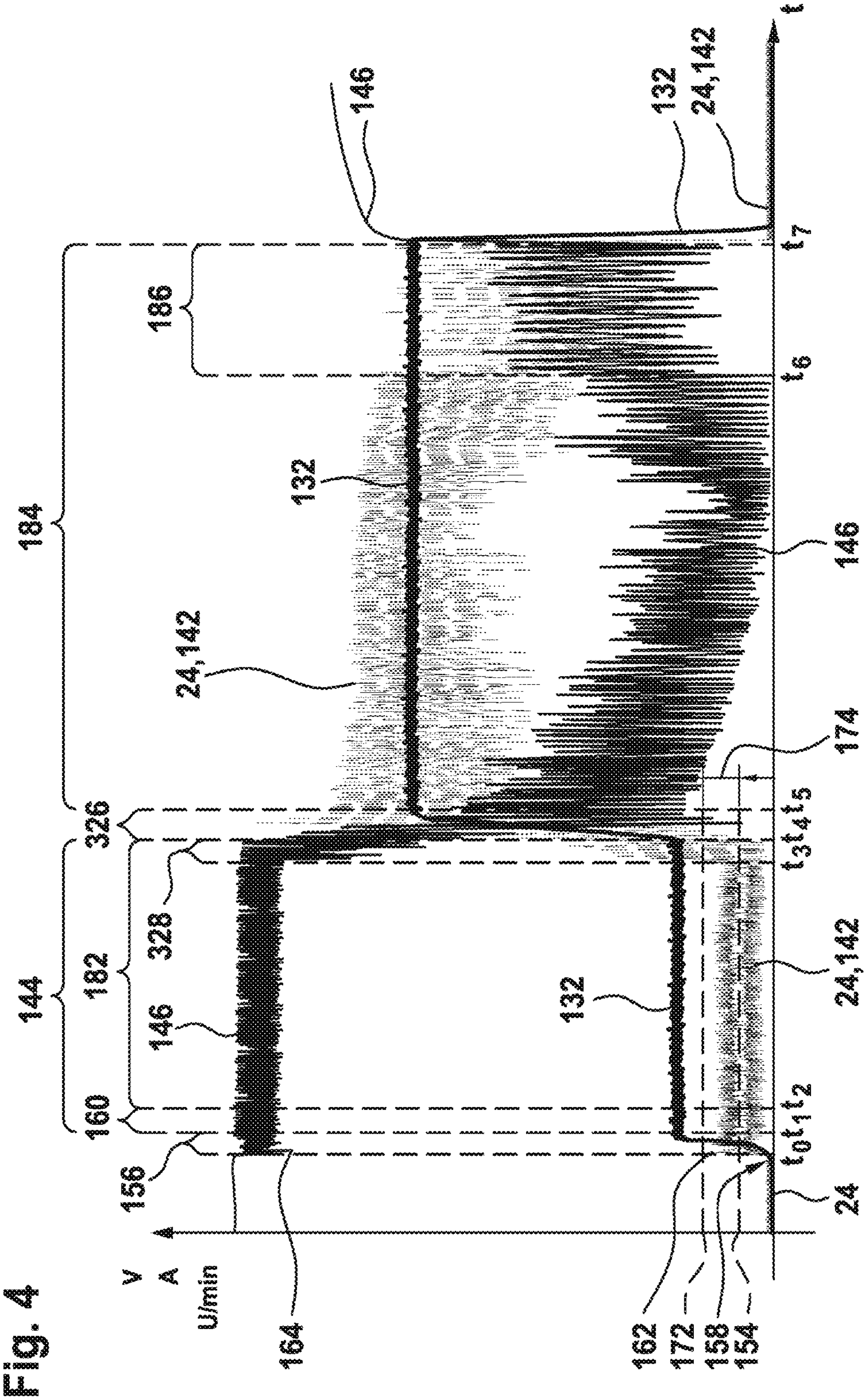
Figure 5:
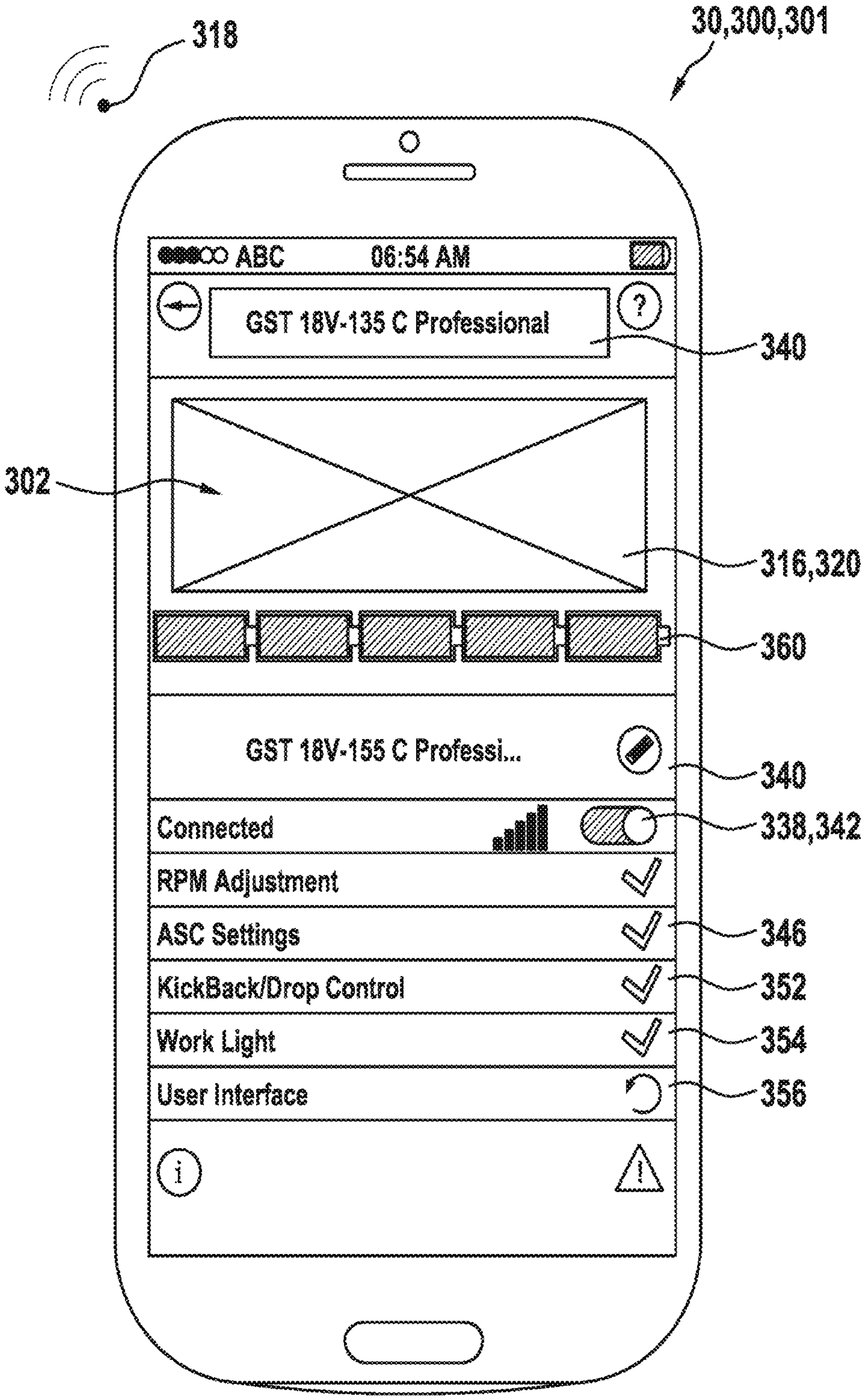
Figure 6:
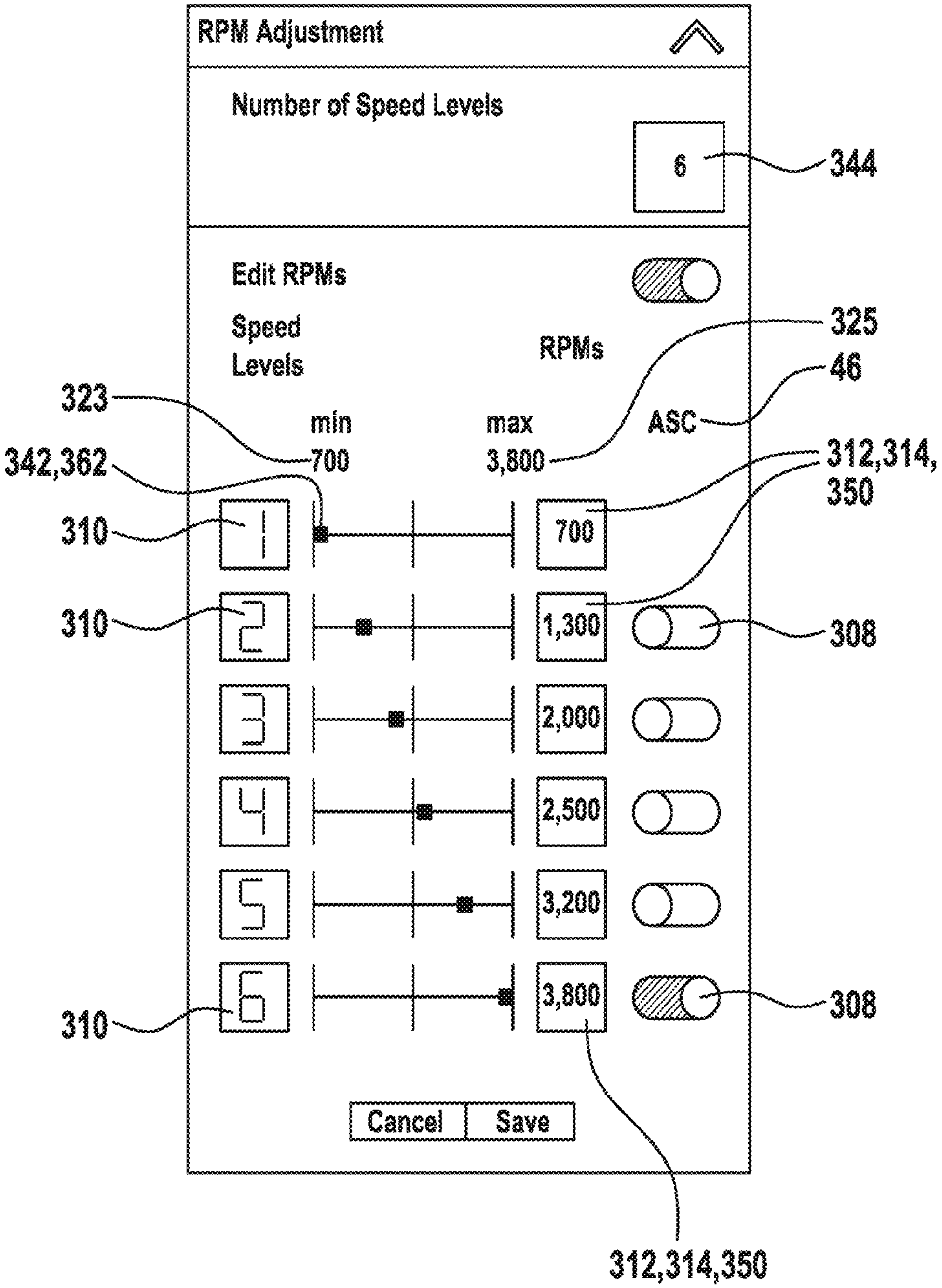
Figure 7:
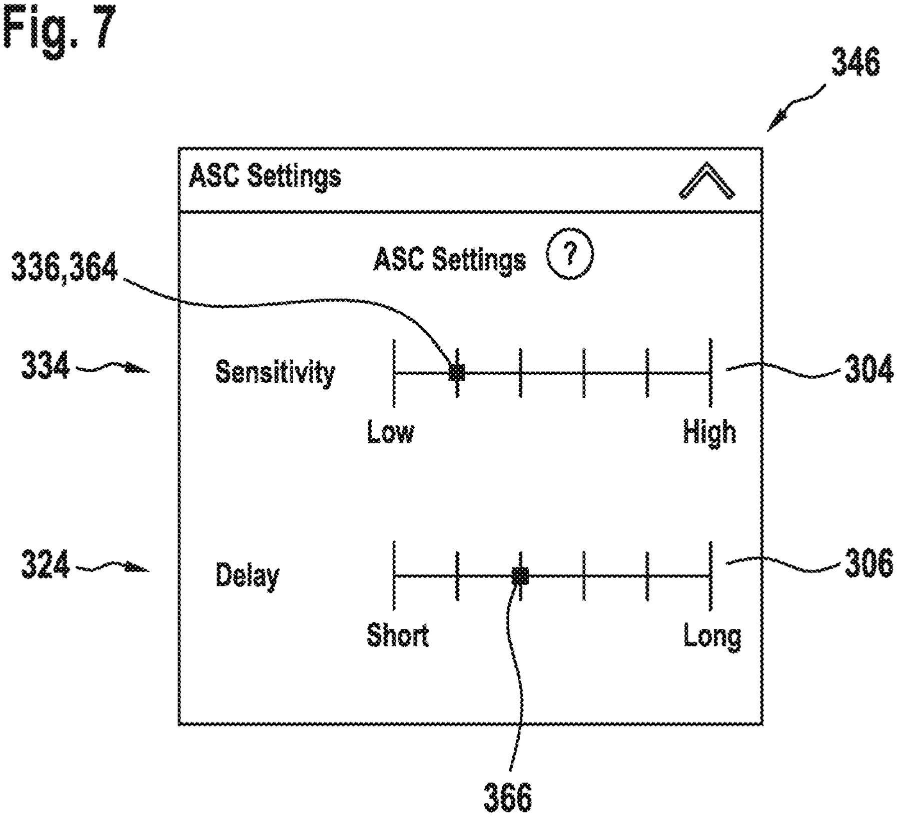
Figure 8:
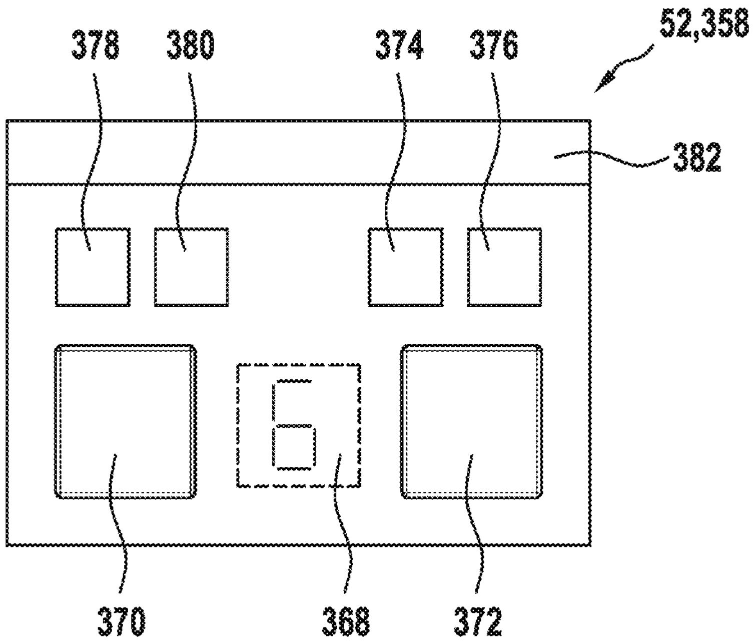
Figure 9:
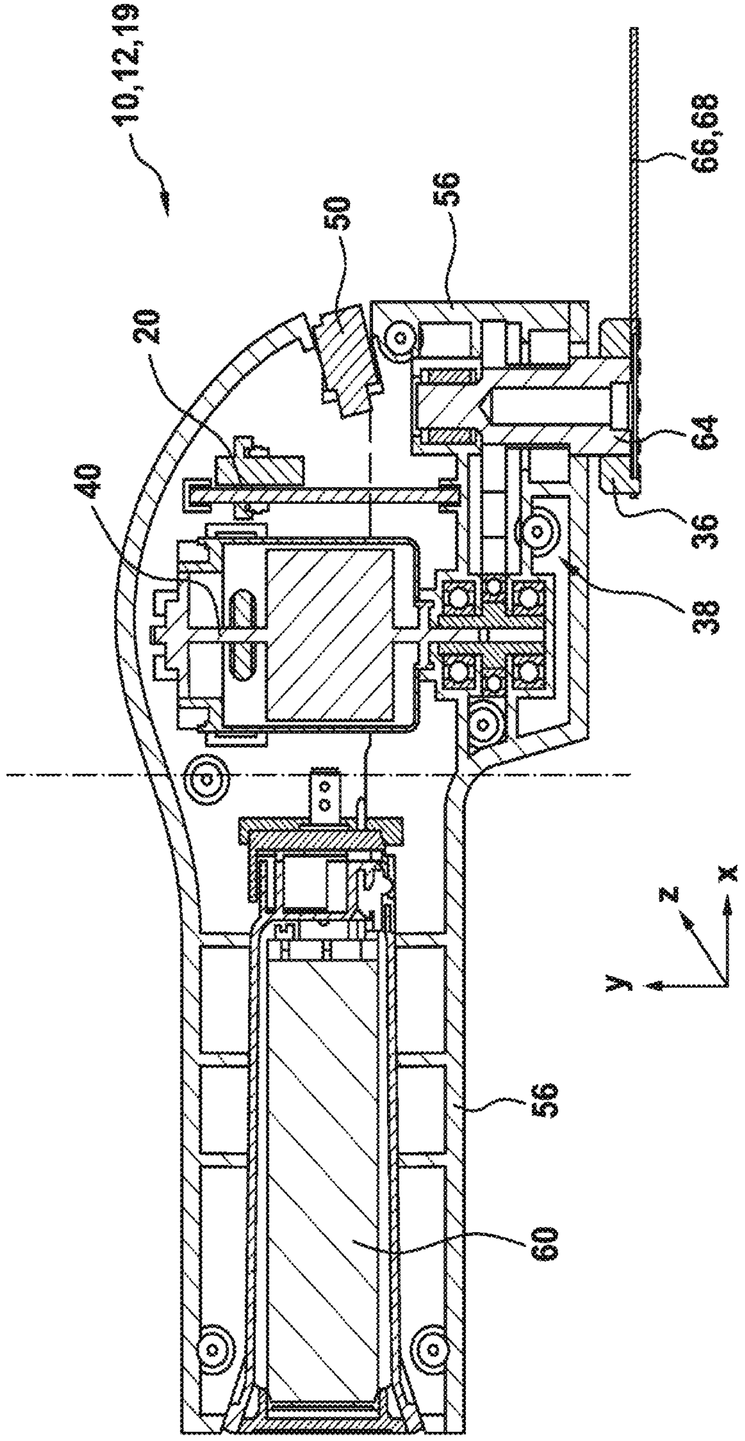
Figure 10:
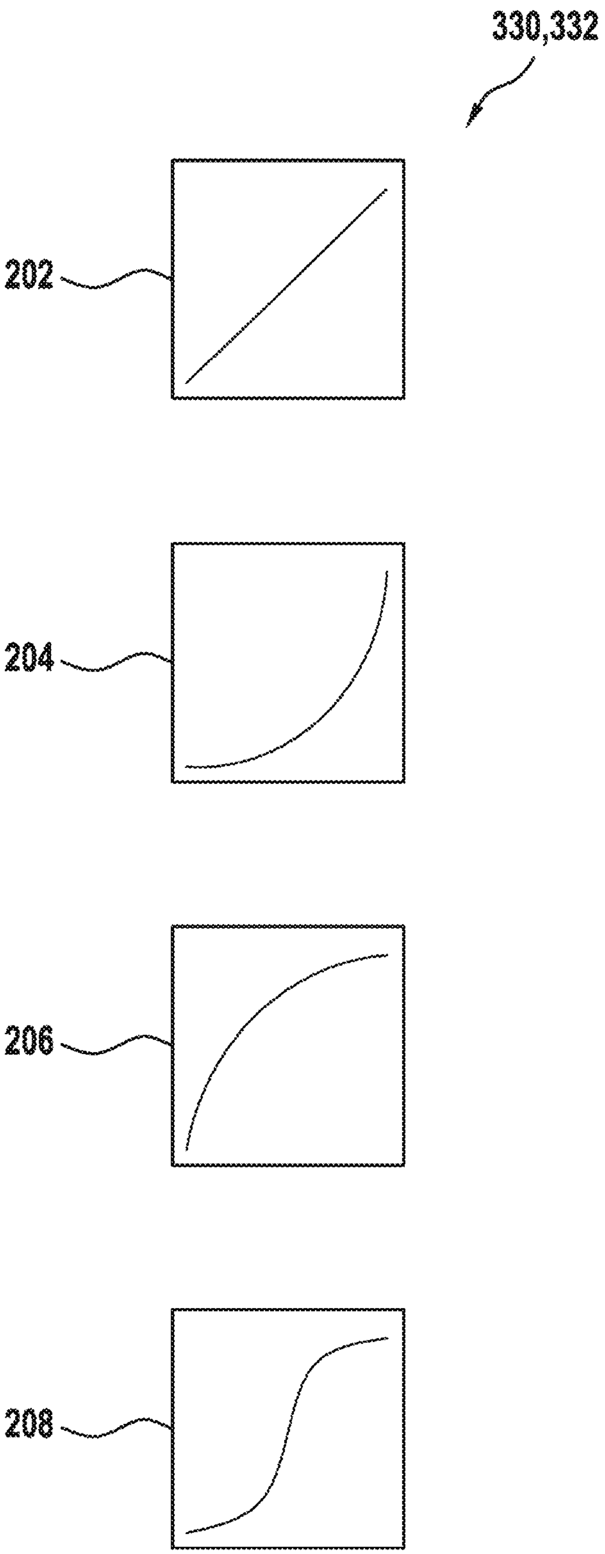

Further advantages, features and details of the disclosure will emerge from the following description, in which exemplary embodiments of the disclosure are described in detail with reference to the drawings. The features mentioned in the disclosure can each be essential to the invention individually or in any combination. Shown are:

FIG. 1 a machine tool in a perspective view,

FIG. 2 the machine tool according to FIG. 1 in a sectional view,

FIG. 3 a method of operating a machine tool with a gentle start-up,

FIG. 4 a plot of the stroke time of the machine tool according to FIG. 1 versus time, FIG. 5 a functional interface used in the method of FIG. 3, FIG. 6 a functional interface used in the method of FIG. 3, FIG. 7 a functional interface used in the method of FIG. 3, FIG. 8 a functional interface used in the method of FIG. 3, FIG. 9 an alternative machine tool in a sectional view, and FIG. 10 a progression of the acceleration function 332 which can be set or selected.

FIG. 1 shows a machine tool 10 in a perspective view. FIG. 2 shows the machine tool 10 according to FIG. 1 in a sectional view. The machine tool 10 is a hand-held machine tool 12. It is a reciprocating saw 16. It is a jigsaw 18. The jigsaw 18 is designed as a bar-shaped jigsaw 48. It therefore differs from a bow-shaped jigsaw (not shown here), which typically has a handle bow. A manual throttle switch is typically located on the handlebar of bow-shaped jigsaws, which can be used to manually control the drive or tool speed, sometimes rendering an automatic gentle start-up obsolete. But even machine tools with manual accelerator switches could in principle have an automatic gentle start-up.

The illustrated machine tool 10 has an on/off switch 50. In addition, the machine tool 10 has a device 52 for selecting different setpoint operating parameters, in particular operating levels or rotational speed levels. This allows different operating levels of a drive unit 40 of the machine tool 10 or stroke rate levels of an output 36 of the machine tool to be selected. The machine tool 10 has a power supply device 58. Here a battery pack 60 or an exchangeable battery pack—in simple terms a replaceable battery. It is therefore a battery-powered or battery-operated electric machine tool. In principle, however, the machine tool could also be mains-powered. The machine tool 10 has the drive unit 40. It has a control or regulating unit 20. This controls or regulates at least the drive unit 40 and/or the energy withdrawal from the battery pack or the provision of load for the drive unit, in particular by controlling or regulating the current or voltage provided. Furthermore, the machine tool 10 has a communication module 62. This is intended to exchange data with an external unit or to be connected to it. In particular, settings, operating parameters, data and other information can be exchanged with an external unit. The communication module is advantageously set up to send and/or receive data, for example via Bluetooth or another network protocol. The machine tool 10 drives a tool holder 64. The drive movement is transmitted by a drive train 38. The drive train 38 converts the rotating drive movement of the drive unit 40 into an oscillating output movement 14 of the output 36 or the tool holder 64, in particular by means of a gearbox (as shown, for example, in FIG. 2). The gear ratio is ideally 5-10, in this case 7.5. Correspondingly here: 7.5 motor revolutions result in one stroke movement. The drive unit 40 is designed as an electric motor, in particular as an EC motor. A tool 66, in this case a replaceable saw blade 68 or jigsaw blade, is inserted into a tool holder 64 of the machine tool. The saw blade 68 can optionally be operated with a pendulum stroke, in particular with a pendulum stroke that can be set. Saw blades 68 with different inertias, weights, geometries and/or other properties can be inserted into the tool holder 64. The drive train 38 of the machine tool can have different internal resistances. Be it because of its running-in and/or lubrication state, because of tolerances between different machine tools of the same type and/or because of other conditions. The battery or battery pack 60 can also have different internal resistances depending on the operating temperature.

Furthermore, the jigsaw 18 has a settable lateral guide 70 for the saw blade 68. This pincer-like guide can be adjusted using a setting mechanism 72. This can lead to increased sliding resistance for the saw blade 68, for example, if a narrow gripper guide is used to prevent the saw blade 68 from running or to increase the cutting precision, or similar. This sliding resistance for the saw blade 68 can also be assigned to the internal resistances of the jigsaw 18, as it can also act when the jigsaw 18 is idling.

FIG. 3 shows a method for operating a machine tool or the machine tool 10 with, in particular, adaptive gentle start-up, in particular for operating a hand-held machine tool 12, advantageously with an oscillating output movement 14, for example a reciprocating saw 16, preferably a jigsaw 18, a reciprocating saw or an oscillating multifunction tool 19. In principle, the method could also be used to operate machine tools, in particular hand-held machine tools, with rotating, oscillating or other input or output movements. It is advantageously designed for machine tools 10 without a manual accelerator switch. In particular, it is intended for machine tools 10 with an on/off switch 50. Advantageously for machine tools 10 with on/off switch 50 and a device 52 for selecting different setpoint operating parameters of the machine tool, in particular setpoint rotational speeds or operating levels, in particular for different operating states under load. The method is particularly preferred for operating machine tools with adaptive, configurable or settable gentle start-up and/or for operation with a functional interface, in particular for setting a gentle start-up. In the following, the method for operating the machine tool 10 or the jigsaw 18 according to FIGS. 1 and 2 is explained by way of example.

In a step 100, the machine tool 10 is switched on according to FIG. 3, for example via an on/off switch 50. See also the time $t_0$ in FIG. 4.

In a step 110, a control or regulating unit 20 of the machine tool 10 checks a setting value, in this case a setpoint rotational speed value for a load mode movement state 184 of the drive unit 40 or the output 36. In this example, it is 3800 strokes/min or 7.5 times the number of revolutions per minute of the drive unit. Alternatively, other values would also be conceivable for a jigsaw 18, here for example stroke rates between 800 and 3800 strokes/min or corresponding rotational speeds of the drive unit 40.

Advantageously, for example, four, six or eight advantageously preconfigured or configurable operating levels 310 can be selected on the machine tool. The respectively set or selected operating level 310 can be displayed, for example, via a display 368 of a function interface 358 of the machine tool 10 (see FIG. 8). A button 370 can be used to select or set different operating levels 310 advantageously corresponding to different operating states under load or operating speeds or rotational speeds of the machine tool 10. The function interface 358 on the machine tool 10 can also provide further selection or display options. For example, a working light of the machine tool 10 can be switched on and off via a button 372. Activation (display fields 374) or deactivation (display fields 376) of the working light can be indicated via display fields 374, 376. Further setting options or information can be output via the display fields 378, 380—e.g. further information is available in an application program of an external device connected to the machine tool (display fields 378) and/or it can be displayed whether a gentle start-up is active or inactive (display fields 380). For example, an output field 382 can signal that a base value and/or threshold ascertaining is currently taking place—as will be explained later—or the like.

Setting values for the operating levels 358 can advantageously be made by a user via an external function interface 300 or an external unit 30. Pre-settable or configurable setting values are advantageously setpoints for the load mode movement state 184 of the machine tool 10—in particular setpoints for a stroke rate of the output drive 36 or the tool 66 or saw blade 68 or a rotational speed of the drive unit 40. Alternatively or additionally, an operating level could also be selected by a user or automatically, for which the corresponding setpoint rotational speed or setpoint stroke rate values are stored in the control or regulating unit 20. These settings can advantageously be made on a function interface 358 of the machine tool 10 and/or the external function interface 300, or the external unit 30. The external function interface 300 or the external unit 30 is advantageously connectable/connected to the machine tool 10 via a communication module 62. The external functional interface 300 or unit 30 is designed in particular as a mobile end device, advantageously as a smartphone see FIG. 5 or tablet. It comprises a corresponding application program or app—i.e. a computer program comprising instructions which, when the program is executed by a computer, cause the computer to enable the aforementioned and subsequent functionality of the external unit. As an alternative to the stroke or rotational speed value, another characteristic physical typical for the machine tool, e.g. a torque, a load, a current, a movement of a drive train component, a stroke rate and/or a drive, output and/or tool speed or the like, can also serve as a setting value.

In a step 120, it is checked, in particular by the control unit 20, whether a gentle start-up is activated, in particular for the predetermined load mode movement state or the selected operating level, in this case the 3800 strokes/min of the output 36 or the corresponding setpoint load rotational speed of the drive unit 40.

If the gentle start-up is activated, in a step 130 the stroke rate 132 of the output or the rotational speed of the drive unit 40—transmission ratio between drive unit 40 and output 36 is 7.5—in FIG. 4 the stroke rate 132 is plotted—of the machine tool 10 is accelerated to an idle operating state or idle mode movement state 144 with a throttled movement (see FIG. 4). The machine tool 10 is therefore set to this state—in this case around 800 strokes/min corresponding to 6000 rpm of the drive unit 40. See also FIG. 4, which shows the acceleration period $t_0$ to $t_1$ and the period $t_1$ to $t_4$ during which the machine tool is operated with a throttled movement. Stroke rates of 250 to 1000 strokes/min, advantageously 500, 700, 800 or 1000 strokes/min, would also be typical for jigsaw 18 for the idle operating state or idle mode movement state 144 with a throttled movement. Deviating stroke rates or rotational speeds for the idle operating state or idle mode movement state 144 with a throttled movement could, for example, be called up or loaded in a step 125 by the control or regulating unit 20, advantageously entered via the function interface 300. In the idle operating state 144 with a throttled movement, the stroke rate 132 is kept as constant as possible (as can also be seen in FIG. 4). If the gentle start-up were not activated, in a step 200 the stroke rate 132 is accelerated directly or sometimes after a delay that can be set and/or further settable parameters to the setpoint load stroke rate or the operating state 184 under load, in this case of 3800 strokes/min corresponding to 38500 rpm of the drive unit 40.

In a step 140, at least one physical characteristic 142 of the machine tool 10, for example the voltage 146 and/or the motor current 24 and/or the battery current, is detected by means of a detection unit 22, in particular the control or regulating unit 20 of the machine tool 10, at least during the idle mode or idle mode movement state 144 of the machine tool 10 with a throttled movement. Here, the motor current 24 is specifically detected by the control or regulating unit. In principle, the detection unit 22 could also be a sensor unit. Comprising at least one sensor or a sensor element; possibly also comprising filters and/or further electronic components, in particular for pre-processing and/or analysis of a sensor signal. The detection unit 22 could also be an external sensor or an external sensor unit, for example at least comprising a microphone, a vibration meter, an optical sensor and/or the like, which is connected to the control or regulating unit 20 of the machine tool 10 and/or an analysis unit at least in wireless or wired connection, at least in order to detect a physical characteristic and to make the measured and/or pre-analyzed data available to a control or regulating unit, in particular the control or regulating unit 20 of the machine tool 10. A microphone could, for example, distinguish typical workpiece scratching noises from noises of idle mode and/or the complete engagement mode of the tool in the workpiece, in particular by, for example, information stored in the analysis unit on reference noises for the different states or the like. In principle, the external sensor unit could even issue control or regulation instructions to the machine tool 10. The external sensor unit could in particular be the function interface 300, in particular comprising an application program intended for data exchange with the machine tool. A sensor could, for example, also be a resistance sensor for a sensor circuit energized by the control or regulating unit 20 or the like, which supplies, for example, a sensor signal representative of the physical characteristic 142 to be detected.

In this example, the motor current 24 of the machine tool 10 is used as a typical physical characteristic. As shown in FIG. 4, it is detected by the control or regulating unit 20 of the machine tool 10 during the idle operating state or idle mode movement state 144 of the machine tool 10 with a throttled movement, which also controls or regulates the drive unit 40, in this case the electric motor.

In a step 150, a base value 154 is ascertained from the detected physical characteristic 142 by means of an analysis unit 152, which in this case is also the control or regulating unit 20—in this case by means of a moving average over a defined detection period 160. Potentially also repetitive during the period 182 until the first time a threshold 172 determined and updated for each repeat ascertaining is overshot (here time $t_3$). When ascertaining the base value 154 of the physical characteristic, a switch-on period 156 of the machine tool 10 (for example between $t_0$ and $t_1$ see FIG. 4) is advantageously not taken into account. The switch-on period 156 is advantageously 100-500 ms from the switch-on time $t_0$ of the machine tool 10. However, it could also be variable—e.g. settable in one step 155 by a user or automatically adapted and set by the control or regulating unit 20. Advantageously detected and/or adapted variably—e.g. using typical measured variables and/or sensor signal curves during acceleration of the machine tool 10, e.g. based on detected inertias of the tool, or delays during initial acceleration of the drive unit 40 or the output 36 or the like. The switch-on period 156 could also be automatically adapted as a function of a set idling rotational speed with a throttled movement, in particular so that at least the drive train of the machine tool is set to a largely uniform and/or constant movement state depending on the idling rotational speed to be achieved. The switch-on period 156 could possibly also be determined and defined based on a self-learning algorithm or the like, in particular in order to keep or select a switch-on period as short as possible, but as long as necessary, in particular so that a base or threshold that is as accurate or unadulterated as possible (i.e. without outlier measurements)—i.e. without disturbance variables—can be ascertained. Here, the switch-on period 156 is around 300 ms from a switch-on time 158 of the machine tool 10. To ascertain the base value 154 or threshold 172, in particular to form a base average value, a detection period 160 of the physical characteristic 142 of advantageously 250-750 ms, here in particular around 500 ms, is taken into account. In the present case, the period $t_1$ to $t_2$ is defined, but could also be variably settable, e.g. in a step 165—e.g. settable by a user or advantageously automatically recognized and/or adapted by the control unit 20—e.g. by typical measurement or sensor signal curves, possibly also by a self-learning algorithm or the like, in particular in order to select the detection period as short as possible, but as long as necessary (so that a precise or reliable base value can be ascertained). Various averaging methods are conceivable for forming the base value 154, in particular common ones—e.g. moving average, weighted average or the like. Here, the arithmetic mean value of the motor current 24 over the detection period 160, in this case 500 ms, is formed as the average value. This is particularly the case immediately after the end of the switch-on period 156, in this case starting after around 300 ms (at time $t_1$) after the switch-on time $t_0$ or after the time $t_0$ of a switch-on 158 of the machine tool 10. As a result, current peaks 162, in particular inrush current peaks of the electric motor current, and/or discontinuities of the physical characteristic 142 during the switch-on period 156 can be disregarded. The accuracy of the base value 154 is increased. By ascertaining the exact base value or threshold, the gentle start-up can ultimately be operated or terminated more sensitively, precisely and/or accurately, or the machine tool 10 can be transferred from the operating state with a throttled movement to the operating state under load more sensitively, precisely and/or accurately.

In a step 170, depending on the ascertained base value 154, a threshold 172 deviating therefrom, in particular a threshold 172 of the physical characteristic 142 deviating as a percentage or absolute value, is ascertained—here in particular ascertained by the control or regulating unit 20. This is defined as threshold 172, in particular stored or saved accordingly in a memory of the control unit 20. A deviation 174 of the threshold 172 from the base value 154 can advantageously be set by a user. The deviation 174 can, for example, be defined via a sensitivity 176. The deviation 174 can advantageously be set as a relative value, percentage or absolute value, in particular as a so-called sensitivity 176, that can advantageously be set for a plurality of presettable setpoint operating states under load, in particular by means of or via a function interface 300, advantageously of a mobile terminal device. See also FIG. 5-7.

In this case, the ascertained threshold 172 for the motor current 24 is above the ascertained base value 154. The degree of deviation of the threshold 172 from the ascertained base value 154 can advantageously be set as so-called sensitivity 176, as will be explained later. When using, for example, a speed or stroke rate signal as a physical characteristic 142, a rotational speed threshold 172 lower than the base value would also be conceivable as a threshold, in particular when specifying a throttled idling motor current to be kept constant, but when operating the machine tool with a variable speed or stroke rate. In this case, it could be assumed that with a constant motor current but increased resistance on the tool due to the scratching of a workpiece, the rotational speed or movement speed of the drive unit drops during scratching. Therefore, a threshold for the physical characteristic can in principle also be overshot or undershot. When detecting vibrations or noises as a typical physical characteristic 142, a vibration or noise threshold above a base value 154 could be defined. This is only intended to show a few examples of the use of various physical characteristics, but is not an exhaustive list.

In a step 180, the control or regulating unit 20, advantageously also as a detection unit 22 of the physical characteristic 142, monitors the movement state with a throttled movement, in this case the motor current 24 in the idle operating state or idle mode movement state 144 of the drive unit 40, in this case at least during the period 182 (cf. $t_2$ to $t_4$ of FIG. 4), during further operation of the machine tool 10. It advantageously compares the currently detected and/or averaged physical characteristic 142 with the threshold 172 for the physical characteristic 142. Provided that the threshold 172 is not overshot or undershot, the idle operating state or idle mode movement state 144 is continued. The comparison of the currently detected physical characteristic 142 with the threshold 172 is continuously continued or repeated. Optionally, a step 185 may also be possible, according to which the steps 140, 150, 170, 180 are repeated, for example if the idle operating state or idle mode movement state 144 with a throttled movement lasts for a longer period of time, for example for 20, 30 or 60 seconds or another period of time. Advantageously, this could be signaled to a user during the period of initial and/or renewed base value 154 and threshold 172 ascertaining or definition, for example visually via the output field 382, haptically/tactilely, audibly and/or the like. This signaling function, e.g. via an output or the output field 382, could therefore also take place without multiple ascertaining.

In a step 190, an overshoot or undershoot of the defined threshold 172 is detected by the physical characteristic 142 if, for example, the tool 66 of the machine tool 10 scratches a workpiece. Cf. time period $t_3$ to $t_4$ in FIG. 4, wherein the motor current 24 overshoots the threshold 172. Overshooting the defined threshold 172 is specifically detected here. This can be, for example, a first overshoot, an overshoot in a number of measurements, an overshoot e.g. for a certain period of time (see $t_3$ to $t_4$ in FIG. 4) and/or an overshoot of an average value of the measurement e.g. of 10-100 ms. Another physical characteristic, e.g. a drop in voltage 146, could also be used to advantageously detect an undershoot of the threshold. By detecting several physical characteristics at the same time, the reliability with which a threshold is detected as being overshot or undershot could be improved or implemented redundantly. The machine tool and an external unit could also each detect a physical characteristic. If both units simultaneously detect an overshoot or undershoot of a threshold, the reliability could also be increased. Depending on the situation or environmental conditions, one or more physical characteristics could also be detected and used individually or together for adaptive gentle start-up control of the machine tool in particular.

In step 200, the drive unit 40 of the machine tool 10, in this case the electric motor, is then accelerated to the load mode movement state 184. A stroke rate 132 of the machine tool 10 or a motor rotational speed of the drive unit 40 is accelerated to the working setpoint, in this case 3800 strokes/min or 38500 rpm, or the machine tool is set to the operating state under load or load mode movement state 184. Alternatively, a motor current, a load, a stroke rate and/or an input, output and/or tool speed or the like could also be specified as a target variable for the load mode movement state.

The acceleration to the load mode movement state 184 can advantageously also take place with a delay, in particular with a delay that can be set, e.g. after a delay period that can be set, e.g. of 0-2 sec—cf. $t_3$ to $t_4$ of FIG. 4, in particular after the threshold 172 has been overshot for the first time by the detected physical characteristic. The delay setting can advantageously be made on a function interface 300 for all or the respective preset load mode movement state.

The acceleration function 332 (see FIG. 10) could also potentially be settable, e.g. having a linear 202, exponential 204, as a root function 206 or as a function with a saddle point 208 (see FIG. 10). This setting could be made in a step 195, for example in which the control or regulating unit checks whether corresponding delay settings and/or acceleration function settings have been defined by the user, wherein these would then be taken into account in the control or regulation of the machine tool 10.

In a step 210, upon detection of idling 186 (cf. between $t_6$ and $t_7$, FIG. 4) of the machine tool 10 in the load mode movement state 184, for example by a typical change in the detected physical characteristic 142, in particular reduction of the motor or battery current 24, in particular over a minimum detection period (not shown here in more detail), which can advantageously be set, the machine tool 10 could be set to a movement state with a throttled movement, advantageously the idle operating state or movement state 144 with a throttled movement could be reset. This would allow the machine tool 10 to be returned to the state of step 130 and steps 140 to 200 to be advantageously repeated.

FIG. 4 illustrates physical characteristics 142 detected during the implementation of the aforementioned method. Accordingly, this could also apply to other operating levels and/or settings for gentle start-up, in particular a configured and/or adaptive gentle start-up. The physical characteristics 142 correspond to the values detected in a test with a machine tool 10 designed as a jigsaw 18, which are shown in relative terms. The time is plotted on the abscissa and the values for the measured voltage 146, the motor current 24 and the stroke rate 132 are shown on the ordinate in relative size. In particular, the voltage signal is shown for a limited range of values for better visibility—i.e. it is displayed in an exaggerated form.

As this is an experimental setup, the measurement begins before the machine tool is switched on to and does not end when the machine tool 10 is switched off t7. In the period before $t_0$, the rotational speed is 0, the voltage is constant according to the pole voltage of the battery pack, and the current is close to 0 due to the measurement and fluctuates slightly. The machine tool 10 is switched on at time $t_0$. The motor current 24 is increased, the stroke rate 132 is raised to the idle mode with a throttled movement and the voltage 146 drops slightly. The current signal 142 and the voltage signal 146 indicate an inrush current peak 162 and a voltage peak 164. In addition to what has already been explained above in the description of the method, a few further aspects are highlighted below. The scratching of the workpiece from time t3 is visible in both the current signal 142 and the voltage signal 146. The control or regulating unit 20 keeps the rotational speed or the stroke rate 132 of the machine tool 10 constant. Due to the increased resistance on the workpiece from time $t_3$, the control unit 20 must increase the motor current 24 in order to keep the rotational speed or stroke rate 132 constant, thereby overshooting the threshold 172. The more precisely (e.g. through fewer outliers, a more constant signal or a narrower signal spread, etc.) the base value 154 can be determined, the less (without causing false triggers) the threshold 172 can deviate from the base value 154, the more sensitively an over- or under-threshold of the physical characteristic 142 can be detected. This is useful, for example, for detecting scratching in balsa wood or another low-resistance workpiece.

With regard to the measured variables in the period $t_4$ to $t_5$, where the rotation or stroke rate 132 is increased from operating state with a throttled movement to a load mode, it becomes clear that the motor current signal 24 and the voltage signal 146 have corresponding current or voltage peaks that are caused by the acceleration of the drive unit 40 to load mode. The workpiece is processed in the period $t_5$ to $t_6$. The rotational speed or stroke rate 132 is kept constant by the control or regulating unit 20, the current 24 fluctuates according to the working conditions, material conditions (cutting conditions), the selected feed rate by the user of the machine tools and sometimes many other boundary conditions such as stroke reversal in the jigsaw, etc. The voltage 146 drops over time in this period $t_4$ to $t_5$ due to the energy consumption of the battery (exaggerated as only shown as a section of a value range)—this effect would probably not be visible in this way with mains devices. From time $t_6$, workpiece processing or cutting is complete. The machine tool 10 is still in the operating state under load and moves at an increased or constant rotation or stroke rate 132 or operating speed. However, the machine tool 10 is now idling. The motor current 24 drops to a value between the idle mode with a throttled movement and the load mode processing the workpiece. The voltage 146 regenerates somewhat. If this idle operating state persists at the setpoint rotational speed or in principle load mode for a predetermined period of time, for example, the control or regulating unit 20 could also return the machine tool 10 to an idle operating state 144, in particular the idle operating state 144 with a throttled movement. For example, at time $t_1$ or $t_2$, depending on whether the base value or threshold formation is to be repeated, or whether a new gentle start-up is to be repeated with the previously ascertained base value or threshold until the next "scratching" is detected—in accordance with the method described above. At time $t_7$, the machine tool is switched off, the rotational speed or stroke rate 132 drops to 0 with a slight delay due to the inertia of the drive train 38, the motor current 24 drops immediately, especially if no current braking is used by the drive unit 40, and the voltage 146 regenerates following the switch-off.

FIGS. 5 through 7 illustrate that a gentle start-up can be configured by a user of the machine tool 10, in particular in conjunction with a function interface 300, which is exemplified here as an external unit that can be connected to the machine tool 10, in this case wirelessly to the communication module 62. Alternatively, however, it could also be a functional interface formed on the machine tool 10, in particular one that exceeds the functionality of the functional interface 358 shown on the machine tool 10. The gentle start-up is to be understood here, in particular more generally than with the "adaptive" gentle start-up, as a control or regulating unit setting a drive unit of the machine tool to an operating state under load when a threshold or scraping threshold, in particular a typical physical characteristic, is overshot or undershot. How this threshold or scraping threshold is formed is irrelevant for the time being. Method steps or features of this so-called "configurable" gentle start-up can, however, be advantageously combined with the features of the aforementioned "adaptive" gentle start-up.

An adaptive gentle start-up is to be understood as at least one method for operating a machine tool comprising the following steps:

- detection—in particular by means of a control or regulating unit 20 of the machine tool 10—of at least one physical characteristic 142 of the machine tool, in particular a motor current 24 of the machine tool 10, during an idle operating state 144 of the machine tool 10 with a throttled movement,
- ascertaining of a scraping threshold 172, in particular a motor current scraping threshold, based on the detected physical characteristic 142, in particular by means of the control or regulating unit 20,
- The system is used to set a drive unit of the machine tool to an operating state under load when an overshoot or undershoot of the ascertained scraping threshold is detected.

Both the adaptive and the configurable gentle start-up are particularly advantageous for machine tools 10 without a manual accelerator switch, especially with an on/off switch 50. The method is designed for operating a machine tool 10 with gentle start-up, in particular a hand-held machine tool 12, advantageously with an oscillating output movement 14, for example a reciprocating saw 16, preferably a jigsaw 18, reciprocating saw or an oscillating multifunction tool 19, wherein the machine tool 10 in at least one method step is in a movement state or operating state with a throttled movement, advantageously idle operating state or idle mode movement state 144, and in a further method step, a drive unit 40 of the machine tool 10 is automatically accelerated to an operating state 184 under load or load mode movement state when an overshoot or undershoot of a scraping threshold 172 is detected, in particular by a control or regulating unit 20 of the machine tool 10. The gentle start-up can be configured by a user of the machine tool 10, for example by making settings for the gentle start-up via a function interface 300, advantageously an HMI, in particular a function interface 300 arranged on the machine tool and/or on an external device 301. The function interface 300 can be in wired or advantageously wireless connection 318 with the machine tool 10, in particular in connection 318 with the control or regulating unit 20 of the machine tool 10. In particular, the gentle start-up can be configured via an app on a smartphone 303 or tablet.

FIG. 5 shows a functional interface 300, in particular an HMI 302. This is an external unit 30, in this case a smartphone 303 with a corresponding application program (app). The function interface 300 is set up to enable a configurable, advantageously adaptive, gentle start-up of a machine tool 10 by a user. It is advantageous to configure the aforementioned adaptive gentle start-up or a gentle start-up of a machine tool in general by a user. The machine tool 10 is advantageously a hand-held machine tool 12, in particular a reciprocating saw 16, preferably a jigsaw 18, a reciprocating saw or an oscillating multifunction tool 19. The function interface 300 comprising means for setting 304, 306 and/or switching on or off 308 the gentle start-up, in particular for different operating levels 310, working setpoints 312 and/or operating states 314 under load, advantageously different working setpoints 312 of a drive rotational speed, stroke rate and/or drive, output and/or tool speed of the machine tool, advantageously for setting 304, 306 and/or switching on or off the gentle start-up jointly for several or optionally individually for each operating level 310, working setpoint 312 and/or operating state under load. The functional interface 300, 358 is advantageously provided by an external unit 30 and/or arranged on the machine tool 10, advantageously at least partially redundantly on both. In particular, the functional interface 300 can be a smartphone 303 or tablet with an application program that enables the configurable gentle start-up, for example via a user interface 316. The external unit 30, in particular the smartphone 303 or tablet, is at least indirectly connected 318 to the machine tool 10, in particular to a control or regulating unit 20 of the machine tool 10, in particular for data exchange, advantageously of input and/or output data. The function interface 300 can be connected 318 to the machine tool 10 wirelessly in principle, but also by wire, in particular via WLAN, Bluetooth, Zigbee or other networks.

The means for setting 304, 306 and/or enabling or disabling 308 the gentle start-up may comprise switching or operating elements, advantageously comprising graphical input and output elements for interaction with a user, in particular shown on the user interface 316 or a display 320 and at least partly provided by an application or control program executed on the functional interface and/or the external device 301. This enables intuitive configuration of the gentle start-up. The application program or functions thereof can also be executed at least partially on a control unit 20 of the machine tool 10. The function interface 300 is advantageously provided for data processing, in particular comprising means for executing a method for enabling the configurable gentle start-up. Also proposed is a computer program comprising instructions which, when the program is executed by a computer, cause the computer to execute the method for enabling the configurable gentle start-up.

A number of operating levels 310, working setpoints 312 and/or operating states 314 under load can be selected, for example in the input and/or output window 322. A working setpoint 312 can be set or selected between a predetermined maximum and minimum value 323, 325 for the respective working setpoint 312. This allows individual settings to be made for the gentle start-up for different operating levels or working setpoints 312 of the machine tool 10. Time can be saved for setting the gentle start-up when switching operating levels 310, in particular via the function interface 358—in particular the switching of operating levels 310 directly on the machine tool 10, in particular via the device 52, as these are already preconfigured with regard to the setting of the gentle start-up via the function interface 300.

An acceleration period 326 can be set, e.g. between $t_4$ and $t_5$ according to FIG. 4, and/or a delay period 328, e.g. between $t_3$ and $t_4$ according to FIG. 4, for setting the machine tool to an operating state 184 under load from detection of an overshoot or undershoot of a scraping threshold 172, here for example at time $t_3$, in particular as a relative value within a certain range, e.g. between short and long, or can be set as a percentage or as an absolute value, advantageously settable between 0 and 2 sec. For this purpose, as shown in FIG. 7, the function interface 300 in the gentle start-up settings (ASC settings 346) has the option of selecting a setting between short and long in the area labeled Delay 324. Acceleration period 326 is to be understood as a period of time for acceleration from an, in particular idle, operating state 144 with a throttled movement to a working setpoint and/or operating state 184 under load. A delay period 328 is to be understood as the period of time of a start of an acceleration of the drive unit 40 to a working setpoint 312 and/or load mode movement state 184, from detection of an overshoot or undershoot of a scraping threshold 172. In particular, the acceleration and/or delay period 328 can be set continuously or in steps—for example of 0.1 sec or 5% or 0.3 sec or 20% or the like. The setting is advantageously made jointly for several working setpoints 312 and/or load mode movement states 184, as shown in FIG. 7, or optionally individually for each working setpoint 312 and/or load mode movement state 314. The gentle start-up can be switched on or off, e.g. via the selection means 308 in FIG. 6. An individual setting for each working setpoint 312 could be configurable by means of a setting symbol for each working setpoint 312, which leads to a submenu when pressed—for example, analogous to that of FIG. 7. This would make it possible to individually set the gentle start-up and positively influence a tear-out behavior for different working setpoints 312. Time could be saved for the user when defining or configuring the gentle start-up for each operating level.

A progression of the acceleration 330, in particular an acceleration function 332, could be set or selected as shown in FIG. 10, for example in a further submenu or the one according to FIG. 7 supplemented by this function, in particular having a linear 202, exponential 204, as a root function 206 or as a function with a saddle point 208, advantageously settable or selectable together for several or optionally individually for each operating level 310, working setpoint 312 and/or load mode movement state 314.

It is proposed that a sensitivity 176, 334 of the gentle start-up can be set, in particular in the form of a duration of an overshoot or undershoot of a scraping threshold and/or a specification of a relative sensitivity of the gentle start-up. In FIG. 7, a user can set the sensitivity 334 (Sensitivity), for example, between low and high. In particular by relocating a slide 336. A user could also specify a relative value, percentage or absolute value of deviation of a scraping threshold 172 from a base value 154 of a physical characteristic 142, in particular base value 154 of a physical characteristic 142 of the machine tool 10 in the operating state with a throttled movement, in particular idle operating state 144 with a throttled movement. This base value would advantageously be a detected and ascertained base value 154 of the physical characteristic 142 of the machine tool 10, in particular according to the aforementioned method for operating a machine tool with adaptive gentle start-up.

Not shown further here, a sensitivity for detection or analysis of a physical characteristic 142 typical for the gentle start-up can also be set, for example by specifying an ascertaining method for forming a threshold, in particular by selecting, for example, the averaging method, e.g. formation of the moving average, a period for averaging the detected values of the physical characteristic, or the like.

The function interface 300 advantageously comprises at least one, advantageously several, of the following further display, selection and/or setting options:

- a connection state 338, designated here as "connected", of an external device 301 providing the functional interface 300, here smartphones 303 with the machine tool 10 and/or an activation or deactivation of a connection with the machine tool 10;
- a name 340, a property and/or a state 342 of the machine tool 10;
- a selection option 344 for a number of operating levels 310 and/or working setpoint rotational speeds 312 available on the function interface and/or a function interface of the machine tool, in particular wherein a changeability of these available operating levels 310 and/or setpoint rotational speed 312 can be blocked;
- a display 350 and/or setting options 346 of a setpoint rotational speed 312 for each operating level 310; an activation or deactivation or enabling or disabling 308 the gentle start-up at least for one, in particular several, advantageously all operating levels 310 and/or setpoint rotational speeds 312; a sensitivity 334 and/or a delay 324 or a delay period 328 of the gentle start-up, in particular jointly for all operating levels 310 and/or setpoint rotational speeds 312, alternatively also optionally individually for each setpoint rotational speed and/or operating level;

a kickback or drop shutdown 352 for the machine tool 10;

a machine light setting option 354, in particular for switching on and off, setting the brightness and/or activating/deactivating a stroboscope mode;

a property 356, in particular a brightness or button assignment of a function interface 358 directly on the machine tool 10, in particular an HMI on the machine tool 10;

a level indicator 360 of the battery or battery pack of the machine tool 10.

It is proposed that the function interface 300 comprises at least one, advantageously a plurality of optical setting sliders 362, 364, 366, which are designed to be displaceable between a minimum and a maximum setpoint, in particular for defining a drive rotational speed, the sensitivity 334 of the gentle start-up and/or a delay period 328 for accelerating the machine tool to load mode after detection of an overshoot or undershoot of a scraping threshold 172.

When a gentle start-up is activated at the function interface 300, an icon for setting further properties of the gentle start-up may appear, in particular for setting further properties of the gentle start-up in a submenu of the application program, advantageously with respect to a setting of the sensitivity 334 and/or the delay period 328 or a delay 324, as shown for example in FIG. 7.

The output of a signal when the (scraping) threshold 172 is overshot and/or during the detection or ascertaining of the base value and/or threshold, in particular an acoustic, optical and/or haptic signal, can be performed, for example, by the or at the functional interface 358 of the machine tool 10 or by the or at the functional interface 300 or the external unit. For example, by output 382 on the machine tool.

It is proposed that after the machine tool 10 has been switched off and switched on again within a minimum rest period, for example 30 seconds, the machine tool 10 is immediately set to a movement state, in particular the load mode movement state 184 that can advantageously be set. On the other hand, once the minimum rest period of e.g. 30 seconds has been overshot, the machine tool 10 is initially operated again with gentle start-up, i.e. with a throttled movement until a scraping threshold 172 is overshot. The times given are merely examples.

FIG. 9 shows an alternative machine tool 10. It is a hand tool 12, advantageously an oscillating multifunction tool 19. It is set up to carry out one of the aforementioned methods or comprises an adaptive and/or configurable gentle start-up function. The oscillating multifunction tool 19 comprises a drive unit 40 and a control or regulating unit 20 at least for controlling or regulating the drive unit 40. It also has a tool holder 64 and advantageously a drive train 38 between drive unit 40 and tool holder 64. The machine tool 10 is battery-powered. Advantageously, the machine tool 10 has a detection unit 22 for time-dependent detection of a physical characteristic of the machine tool 10, preferably for time-dependent detection of a motor current and/or a motor rotational speed of the drive unit 40 designed as a drive motor.

The oscillating multifunction tool 19 can also be operated as a system with the function interface 300 or other external unit to enable a configurable and/or adaptive gentle start-up.

At least other identical parts in principle are provided with corresponding reference signs.

The invention claimed is:

1. A method for operating a hand-held machine tool with an oscillating or stroke-shaped output movement comprising:

detecting at least one physical characteristic of the machine tool during an idle operating state of the machine tool with a throttled movement, by a control or regulating unit of the machine tool, wherein the at least one physical characteristic comprises a motor and/or battery current detected by an analysis unit comprising the control or regulating unit of the machine tool;

ascertaining a first scraping threshold of the at least one physical characteristic on the basis of the detected physical characteristic;

setting at least one drive unit of the machine tool to an operating state under load with an increased movement speed relative to the idle operating state with a throttled movement in a further operation of the machine tool in response to detecting an overshoot or undershoot of the ascertained threshold;

detecting a reduction of the motor and/or battery current with the at least one drive unit of the machine tool set to the operating state under load;

further detecting the motor and/or battery current after the detected reduction of the motor and/or battery current; and modifying the idle operating state with the throttled movement based upon the further detection.

2. The method according to claim 1, wherein a second scraping threshold is ascertained by using the analysis unit to ascertain a base value from the further detected motor and/or battery current, wherein the base value is a base average value, and, as a function of the ascertained base value, the second scraping threshold deviating therefrom is calculated as a percentage or absolute value.

3. The method according to claim 2, wherein, when ascertaining the first scraping threshold, a switch-on period of the machine tool is not taken into account.

4. The method according to claim 2, wherein, when ascertaining the first scraping threshold, a detection period of the at least one physical characteristic of 10-1000 ms is taken into account immediately after an end of a switch-on period starting after 100-500 ms from the time of a switch-on of the machine tool.

5. The method according to claim 4 wherein:

when ascertaining the second scraping threshold or the base value the detection period of the at least one physical characteristic is 250-750 ms.

6. The method according to claim 5 wherein:

when ascertaining the second scraping threshold or the base value the detection period is around 500 ms.

7. The method according to claim 2, wherein when the first scraping threshold is overshot and/or during the detection and/or ascertaining of the base value and/or second scraping threshold, a signal in the form of an acoustic, optical and/or haptic signal, is output on an output field of the machine tool, on a functional interface and/or on an external unit.

8. The method according to claim 1, wherein:

the idle operating state of the machine tool with a throttled movement corresponds to a setpoint rotational speed of the at least one drive unit of 2000 to 10000 rpm or to an oscillation or stroke rate of an output unit of 250 to 1000 oscillations or strokes/min; and/or the operating state of the machine tool under load corresponds to a setpoint rotational speed of the at least one drive unit of 6000-30000 rpm or a stroke rate of the output unit of 800 to 3800 strokes/min;

the setpoint is a presettable setpoint; and the setpoint is one of 2-10 operating levels.

9. The method according to claim 1, wherein, after the machine tool has been switched off and switched on again within a minimum rest period, the machine tool is immediately set to a load mode movement state wherein the machine tool is accelerated to a variably settable load mode movement state without previously being set to the idle operating state with a throttled movement.

10. A hand-held machine tool in the form of a jigsaw, reciprocating saw, or oscillating multifunction tool configured to carry out the method according to claim 1.

11. A system comprising:

a hand-held machine tool in the form of a jigsaw, reciprocating saw, or oscillating multifunction tool; and a function interface and/or an external unit in the form of a mobile terminal device set up to carry out the method according to claim 1.

12. The method according to claim 1, further comprising:

receiving, by the control or regulating unit, a user-defined transition parameter via a user interface, wherein the user-defined transition parameter governs a transition of the motor from the idle operating state to the operating state under load, wherein setting the at least one drive unit of the machine tool to the operating state under load with the increased movement speed in response to detecting the overshoot or undershoot of the ascertained threshold comprises:

setting the at least one drive unit of the machine tool to the operating state under load with the increased movement speed based upon the received user-defined transition parameter.

* * * * *